(12) United States Patent
Jiang et al.

(10) Patent No.: US 10,896,189 B2
(45) Date of Patent: Jan. 19, 2021

(54) DIVERSITY EVALUATION IN GENEALOGY SEARCH

(71) Applicant: Ancestry.com Operations Inc., Lehi, UT (US)

(72) Inventors: Peng Jiang, Sunnyvale, CA (US); Ruhan Wang, Washington, DC (US); Gann Bierner, Oakland, CA (US); Azadeh Moghtaderi, Los Gatos, CA (US)

(73) Assignee: Ancestry.com Operations Inc., Lehi, UT (US)

( * ) Notice: Subject to any disclaimer, the term of this patent is extended or adjusted under 35 U.S.C. 154(b) by 0 days.

(21) Appl. No.: 16/481,030

(22) PCT Filed: Aug. 10, 2018

(86) PCT No.: PCT/US2018/046320
§ 371 (c)(1),
(2) Date: Jul. 25, 2019

(87) PCT Pub. No.: WO2019/033032
PCT Pub. Date: Feb. 14, 2019

(65) Prior Publication Data
US 2019/0391975 A1    Dec. 26, 2019

Related U.S. Application Data

(60) Provisional application No. 62/544,565, filed on Aug. 11, 2017.

(51) Int. Cl.
*G06F 16/00* (2019.01)
*G06F 16/2458* (2019.01)
(Continued)

(52) U.S. Cl.
CPC .... *G06F 16/2462* (2019.01); *G06F 16/24578* (2019.01); *G06F 16/256* (2019.01);
(Continued)

(58) Field of Classification Search
CPC .... G06F 16/958; G06F 16/2462; G06F 16/35; G06F 16/583; G06F 16/285;
(Continued)

(56) References Cited

U.S. PATENT DOCUMENTS 6,862,559 B1    3/2005 Hogg
2002/0042793 A1*    4/2002 Choi ............... G06F 16/335
(Continued)

OTHER PUBLICATIONS

Agrawal, R. et al., "Diversifying search results," Proceedings of the second ACM international conference on web search and data mining, ACM, 2009, pp. 5-14. ACM.
(Continued)

*Primary Examiner* — Augustine K. Obisesan
(74) *Attorney, Agent, or Firm* — Fenwick & West LLP

(57) ABSTRACT

An information entropy-based metric is used to represent a degree of diversity of a search result of genealogical records. In response to a query, a data query server locates a set of multiple records that match the query. The records are classified into different record types based on the records' attributes. One or more distributions of numbers of records classified into each record type are determined. Each distribution corresponds to one of the subsets the records. For each distribution, an entropy value is determined. A cumulative entropy that corresponds to a sum of the entropy values of those distributions is then determined. The cumulative entropy may serve as the entropy-based metric of the search result. The cumulative entropy may also be normalized by an ideal cumulative entropy. The normalized metric allows the diversity of different search results to be com-
(Continued)

pared across different queries that may generate different numbers of records.

20 Claims, 13 Drawing Sheets

(51) Int. Cl.
  *G06F 16/28* (2019.01)
  *G06F 16/25* (2019.01)
  *G06F 16/9535* (2019.01)
  *G06F 16/2457* (2019.01)
  *G06F 17/10* (2006.01)

(52) U.S. Cl.
  CPC ........ *G06F 16/285* (2019.01); *G06F 16/9535* (2019.01); *G06F 17/10* (2013.01); *G06F 2201/81* (2013.01)

(58) Field of Classification Search
  CPC ............. G06F 16/256; G06F 16/24578; G06F 16/9535; G06F 16/904; Y10S 707/99936; Y10S 707/99933; G01B 40/00; G01B 45/00; G01B 10/00
  See application file for complete search history.

(56) References Cited

U.S. PATENT DOCUMENTS

| | | | |
|---|---|---|---|
| 2004/0083226 A1* | 4/2004 | Eaton .................... | G06F 16/289 |
| 2005/0125433 A1* | 6/2005 | Akaboshi .......... | G06F 16/24556 |
| 2007/0198597 A1 | 8/2007 | Betz et al. | |
| 2008/0249999 A1* | 10/2008 | Renders ................ | G06F 16/355 |
| 2011/0010371 A1 | 1/2011 | Xu et al. | |
| 2011/0153615 A1* | 6/2011 | Mizuguchi ............ | G06F 16/353 |
| | | | 707/740 |
| 2011/0196872 A1* | 8/2011 | Sims ................. | G06F 16/90344 |
| | | | 707/740 |
| 2012/0158702 A1* | 6/2012 | Kumar .................. | G06F 16/215 |
| | | | 707/723 |
| 2012/0197882 A1 | 8/2012 | Jensen | |
| 2012/0226559 A1* | 9/2012 | Baum ................... | G06Q 30/02 |
| | | | 705/14.66 |
| 2014/0188768 A1 | 7/2014 | Bonissone et al. | |
| 2017/0213127 A1* | 7/2017 | Duncan ................. | G16B 50/00 |
| 2018/0025087 A1* | 1/2018 | Kalyanaraman ....... | G06Q 50/01 |
| | | | 707/710 |

OTHER PUBLICATIONS

Anagnostopoulos, A. et al., "Sampling search-engine results," World Wide Web, 2006, vol. 9, No. 4, pp. 397-429.
Carbonell, J.G. et al., "The use of MMR, diversity-based reranking for reordering documents and producing summaries," SIGIR, 1998, vol. 98, pp. 335-336.
Chapelle, O. et al., "Intent-based diversification of web search results: metrics and algorithms," Information Retrieval, 2011, vol. 14, No. 6, pp. 572-592.
Chapelle, O. et al., "Expected reciprocal rank for graded relevance," Proceedings of the 18th ACM conference on Information and knowledge management, ACM, 2009, pp. 621-630.
Clarke, C. L. et al., "Overview of the trec 2009 web track," Waterloo Univ (Ontario), 2009, 10 pages.
Clarke, C.L. et al., "A comparative analysis of cascade measures for novelty and diversity." Proceedings of the fourth ACM international conference on Web search and data mining, ACM, 2011, pp. 75-84.
Clarke, C.L. et al., "Novelty and diversity in information retrieval evaluation." Proceedings of the 31st annual international ACM SIGIR conference on Research and development in information retrieval, ACM, 2008, pp. 659-666.
Drosou, M. et al., "Search result diversification." SIGMOD record, 2010, vol. 39, No. 1, pp. 41-47.
Krestel, R. et al., "Reranking web search results for diversity," Information retrieval, 2012, vol. 15, No. 5, pp. 458-477.
Van Zwol, R. et al., "Diversifying image search with user generated content," Proceedings of the 1st ACM international conference on Multimedia information retrieval, ACM, 2008, pp. 67-74.
Radlinski, F. et al., "Improving personalized web search using result diversification," Proceedings of the 29th annual international ACM SIGIR conference on Research and development in information retrieval, ACM, 2006, pp. 691-692.
Radlinski, F. et al., "Learning diverse rankings with multi-armed bandits," Proceedings of the 25th international conference on Machine learning, ACM, 2008, pp. 784-791.
Rafiei, D. et al., "Diversifying web search results," Proceedings of the 19th international conference on World wide web, ACM, 2010, pp. 781-790.
Sakai, T. et al., "Evaluating diversified search results using per-intent graded relevance," Proceedings of the 34th international ACM SIGIR conference on Research and development in Information Retrieval, ACM, 2011, pp. 1043-1052.
Weaver, W. et al , "The mathematical theory of communication," Champaign, IL: University of Illinois Press, 1963.
Vargas, S. et al., "Rank and relevance in novelty and diversity metrics for recommender systems," Proceedings of the fifth ACM conference on Recommender systems, ACM, 2011, pp. 109-116.
Giannopoulos, G. et al., "Diversifying user comments on news articles," International Conference on Web Information Systems Engineering, 2012, pp. 100-113.
Wang, X. et al., "Evaluating search result diversity using intent hierarchies," Proceedings of the 39th International ACM SIGIR conference on Research and Development in Information Retrieval, ACM, 2016, pp. 415-424.
Wu, S. et al., "Search result diversification via data fusion," Proceedings of the 37th international ACM SIGIR conference on Research & development in information retrieval, ACM, 2014, pp. 827-830.
Zhai, C. et al., "Beyond independent relevance: methods and evaluation metrics for subtopic retrieval," ACM SIGIR Forum ACM, 2015, vol. 49, No. 1, pp. 2-9.
PCT International Search Report & Written Opinion, International Application No. PCT/US2018/046320, dated Jan. 30, 2019, 16 Pages

* cited by examiner

SEARCH

RECORD
- All Records
- Census
- Vital Records
  - Death
  - Birth
  - Marriage
  - Divorce
- Military
- Immigration & Passenger Lists

PEOPLE
- Living People Search
- City & Telephone Directories

TREES
- Family Trees

First Name: John x  ☐ Exact
Last Name (Required): Smith x  ☐ Exact
Middle Name
Maiden Name
Location (City, County, State, Country) ▶
Birth Year  +/- ▶
Collection ▶

🔍 SEARCH NOW

DIVERSITY EVALUATION IN GENEALOGY SEARCH

PRIORITY

This application claims the benefit of U.S. Provisional Application No. 62/544,565 filed Aug. 11, 2017, which is incorporated by reference in its entirety.

BACKGROUND

This disclosure relates generally to searching and ranking genealogical records. Specifically, this disclosure relates to providing an entropy-based metric to model a degree of diversity of a search and ranked result of genealogical records.

Genealogy search helps people discover their family history. It could include a search for documents such as birth records, death records, immigration records, etc. Interesting stories of a person could be included across different record categories. For example, a complete life story about a person could be formed based on a combination of birth, residence, marriage, immigration and death records. As such, it is important for a genealogical data query server to return a diversified search result that includes different types of records.

SUMMARY

Disclosure described herein relates to methods and processes for determining degrees of diversity of genealogical search results that are generated based on user queries. A research result may include a collection of records that can be classified into one of different types. For example, in a genealogical search, there can be different record types such as birth, death, marriage, etc. In one embodiment, it may be assumed that there is no preference (or no substantive difference in terms of preference) for a particular record type in determining diversity. A highly diversified search result would cover as many different record types as possible. An information entropy-based metric may be used to describe the search result's distribution of records that are classified into different record types. The entropy-based metric may be a cumulative entropy that is based on a sum of individual entropy values associated with different ranked positions. The cumulative entropy may further be normalized by an ideal cumulative entropy to a predetermined scale (e.g., between 0 and 1) so that the degrees of diversity of search results across different queries can be compared. The normalized cumulative entropy could be used to measure diversity in a ranked list.

By way of example, a process of evaluating of the diversity of a search result may be associated with a response to a user query. After the user query is received, a data query server locates a set of genealogical records that match the query. The server may also rank the set of genealogical records based on, for example, relevancy of each record compared to the search query. The server then classifies the genealogical records into a plurality of record types based on one or more attributes of the records. For example, genealogical records may be classified based on the categories (e.g., birth, marriage, immigration, death, etc.) of the record. Based on the classification, the server determines one or more distributions of the numbers of records that are classified into each of the record types. Each distribution corresponds to a subset of records that belong to the search result. For example, the server may select a first subset that includes a certain number of records that belong to the search result and determine the numbers of records in each record type to construct the distribution. An entropy value is then determined based on the distribution. The server may also select additional subsets of records that belong to the search result and determine additional distributions. Hence, more entropy values are determined based on those distributions. An entropy-based metric of the search result may be a cumulative entropy that is based on the sum of the entropy values of the one or more distributions that correspond to different subsets.

In one embodiment, an entropy-based metric may measure not only the global degree of diversity, but also local diversity in terms of the rank order of the search result. Global diversity may refer to a measure of how many record types are presented in the list. Global diversity may disregard the actual rank order in a search result. Local diversity measures the degree of diversity of records that are in proximity of other records in the rank order. For example, if different record types are represented by letters, such as A, B, etc., $R^A$ represents a record of type A, and $R^B$ represents a record of type B, then a rank order of a list L1 of $[R^A, R^A, R^B, R^B]$ has better global diversity than a rank order L2 of $[R^A, R^A, R^A, R^A]$. It is because L1 covers two record types while L2 covers only one type. Now given another rank list L3 of $[R^A, R^B, R^A, R^B]$, then there is no difference between L1 and L3 in terms of global diversity because both list includes two records of type A and two records of type B. However, L3 has better local diversity of L1 because the adjacent records in L3 in the rank order have different record types. This is also indicated by the fact that the top two results in L3 cover two record types while the top two results in L1 cover only one record type.

To capture both the global and local diversity, in one embodiment, the selection of subsets of records is based on a rank order of the set of records in the search result. For example, each subset may be selected based on a ranked position in the rank order. For a given subset associated with the ranked position, the records preceding and right at the ranked positions in the rank order are selected. As such, the entropy value associated with a given ranked position can be calculated based on the distribution of the subset associated with the ranked position. One example cumulative entropy corresponds to a sum of the entropy values associated with ranked position. This cumulative entropy allows the degree of diversity associated with a particular rank order to be determined at the same time with the degree of diversity of the entire set.

To further improve the entropy-based metric, the cumulative entropy determined based on a particular rank order of the search result may be normalized. In one embodiment, a given cumulative entropy is normalized by an ideal cumulative entropy, which corresponds to a projected maximum entropy of a search result given the total number of records in the search result and the total number of record types. The ideal cumulative entropy may be determined based on the premise that a uniform distribution of numbers of record types achieves a theoretical maximum entropy and a constraint that the number count of each type should be an integer so that a perfectly uniform distribution is not always achievable. In one approach, the ideal cumulative entropy is determined by a branch and bound algorithm that tests the entropy values under different integer count of each record type. After the ideal cumulative entropy for a search result is determined, the cumulative entropy can be normalized to a predetermined scale.

The entropy-based metric provides a novel way to evaluate the ranking performance from a diversity perspective for both search results and hint prioritization. It also provides a way to measure how diversity of record collections may influence user engagements. It further provides directions to administrators of a search engine to further improve the search model.

While this disclosure is described with exemplary embodiments that are associated with genealogical records, the entropy-based metric and related processes in determining such metric described herein can be applied to other areas of search queries and are not limited to the field of genealogy.

In one embodiment, a computer-implemented method is described. The method comprises accessing a set of genealogical records based on a search query, each genealogical record comprising one or more attributes. The method also comprises ranking the set of genealogical records in a rank order. The method also comprises classifying the genealogical records into a plurality of record types based on the one or more attributes of the genealogical records. The method further comprises selecting one or more subsets from the set of genealogical records based on the rank order. The method further comprises determining one or more distributions of numbers of genealogical records that are classified into each of the plurality of record types, each of the one or more distributions corresponding to one of the one or more subsets. The method further comprises determining an entropy-based metric based on an entropy value of each of the one or more distributions, wherein the entropy-based metric represents a degree of diversity of the set of genealogical records in the rank order.

In one embodiment, determining the entropy-based metric comprises determining the entropy values of the one or more distributions, each distribution being based on a ranked order and having an entropy value that is determined based on the numbers of genealogical records that are classified into each of the plurality of the record types of the distribution and determining a cumulative entropy that corresponds to a sum of the determined entropy values of the one or more distributions, the cumulative entropy being the entropy-based metric.

In one embodiment, the entropy values of the one or more distributions are each determined based on:

$$E(Q) = -\sum_{i=1}^{K} p_i \log p_i$$

In one embodiment, determining the entropy-based metric further comprises determining an ideal cumulative entropy, and determining a normalized cumulative entropy that is based on the cumulative entropy normalized by the ideal entropy, the normalized cumulative entropy being the entropy-based metric instead of the cumulative entropy.

In one embodiment, the normalized cumulative entropy is normalized to a scale between 0 and 1, and the computer-implemented method further comprises: comparing the normalized cumulative entropy to a threshold that is pre-set to be between 0 and 1 and responsive to the normalized cumulative entropy being below the threshold, re-ranking the set of genealogical records.

In one embodiment, the ideal cumulative entropy is based on a distribution that is more uniformly distributed than a distribution of the set of genealogical records.

In one embodiment, the ideal cumulative entropy is based on a total number of genealogical records in the set and a total number of record types.

In one embodiment, the ideal entropy is determined using a branch and bound algorithm.

In one embodiment, determining the ideal cumulative entropy comprises: determining maximum entropies of the one or more distributions, each distribution having a maximum entropy based on a number of genealogical records in the distribution and a number of record types in the distribution, and summing the maximum entropies.

In one embodiment, the entropy-based metric corresponds to an entropy value of a single distribution and the subset that corresponds to the single distribution is the entire set of genealogical records.

In one embodiment, the one or more attributes used to classify each of the genealogical records into one of the plurality of record types are data categories selected from the group consisting of: birth, marriage, death, residence, immigration, military, court, and directories.

In one embodiment, the method further comprises, responsive to the entropy-based metric being higher than a threshold, sending the set of genealogical records in the rank order to a client device.

In one embodiment, the computer-implemented method further comprising: comparing the entropy-based metric to a threshold, and responsive to the entropy-based metric being below the threshold, re-ranking the set of genealogical records.

In one embodiment, a re-ranked set of genealogical records, which is re-ranked from an original set, has a value of entropy-based metric that is higher than the original set.

In one embodiment, determining the one or more distributions comprises: selecting the subsets of genealogical records from the set of genealogical records based on a rank order of the set based on criteria of: (i) having two or more genealogical records in each subset, and (ii) the two or more genealogical records of the subset being within a threshold distance of each other by the rank order; determining a distribution for each of subsets by counting a number of records that are classified into each record type.

In one embodiment, each of the subsets is smaller than the set.

In one embodiment, each of the subsets has different numbers of genealogical records.

In one embodiment, a latter subset from the subsets selected comprises one additional genealogical record than a previous subset, the one additional genealogical record being a record immediately succeeding a last record of the previous subset in the rank order.

In one embodiment, a computer-implemented method is described. The computer-implemented method comprises accessing a set of genealogical records that correspond to a rank order. The computer-implemented method also comprises determining an entropy value associated with each ranked position in the set of genealogical records, the entropy value associated with each ranked position corresponding to a distribution of a subset of genealogical records that are selected based on the ranked position. The computer-implemented method further comprises determining an entropy-based metric based on the entropy values of the ranked positions in the set of genealogical records. The computer-implemented method further comprises responsive to the entropy-based metric being lower than a threshold, re-determining the rank order.

In one embodiment, the re-determined rank order corresponds to a higher value of entropy-based metric.

In one embodiment, the subset of genealogical records associated with a ranked position comprises genealogical records that precede the ranked position.

In one embodiment, each of the subset associated with each ranked position has a different number of records.

In one embodiment, each of the subsets is smaller than the set.

In one embodiment, wherein a latter subset associated with a latter ranked position has one additional genealogical record than a previous subset associated with a previous ranked position immediately preceding the latter ranked position.

In one embodiment, the one additional genealogical record is a record immediately succeeding a last record of the previous subset in the rank order.

In one embodiment, the entropy value associated with each ranked position is determined based on:

$$E(Q) = -\sum_{i=1}^{K} p_i \log p_i$$

In one embodiment, determining the entropy-based metric comprises: determining a cumulative entropy that corresponds to a sum of the determined entropy values associated with the ranked positions, the cumulative entropy being the entropy-based metric.

In one embodiment, determining the entropy-based metric further comprises: determining an ideal cumulative entropy, and determining a normalized cumulative entropy that is based on the cumulative entropy normalized by the ideal entropy, the normalized cumulative entropy being the entropy-based metric instead of the cumulative entropy.

In one embodiment, the normalized cumulative entropy is normalized to a scale between 0 and 1.

In one embodiment, the ideal cumulative entropy is using a branch and bound algorithm.

In one embodiment, a non-transitory computer readable storage medium is described. The non-transitory computer readable storage medium is configured to store program code, the program code comprising instructions that, when executed by a processor, cause the processor to: receive a search query from a user; access a set of genealogical records based on the search query, each genealogical record comprising one or more attributes; classify the genealogical records into a plurality of record types based on the one or more attributes of the genealogical records; determine one or more distributions of numbers of genealogical records that are classified into each of the plurality of record types, each of the one or more distributions corresponding to a subset of the genealogical records; and determine an entropy-based metric based on an entropy value of each of the one or more distributions, wherein the entropy-based metric represents a degree of diversity of the set of genealogical records.

BRIEF DESCRIPTION OF THE DRAWINGS

FIG. 2 is a diagram illustrating an exemplary search user interface for a genealogical system, in accordance with an embodiment.

FIG. 8 is a plot illustrating an experimental result that shows the differences between exact maximum possible entropy and approximation, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
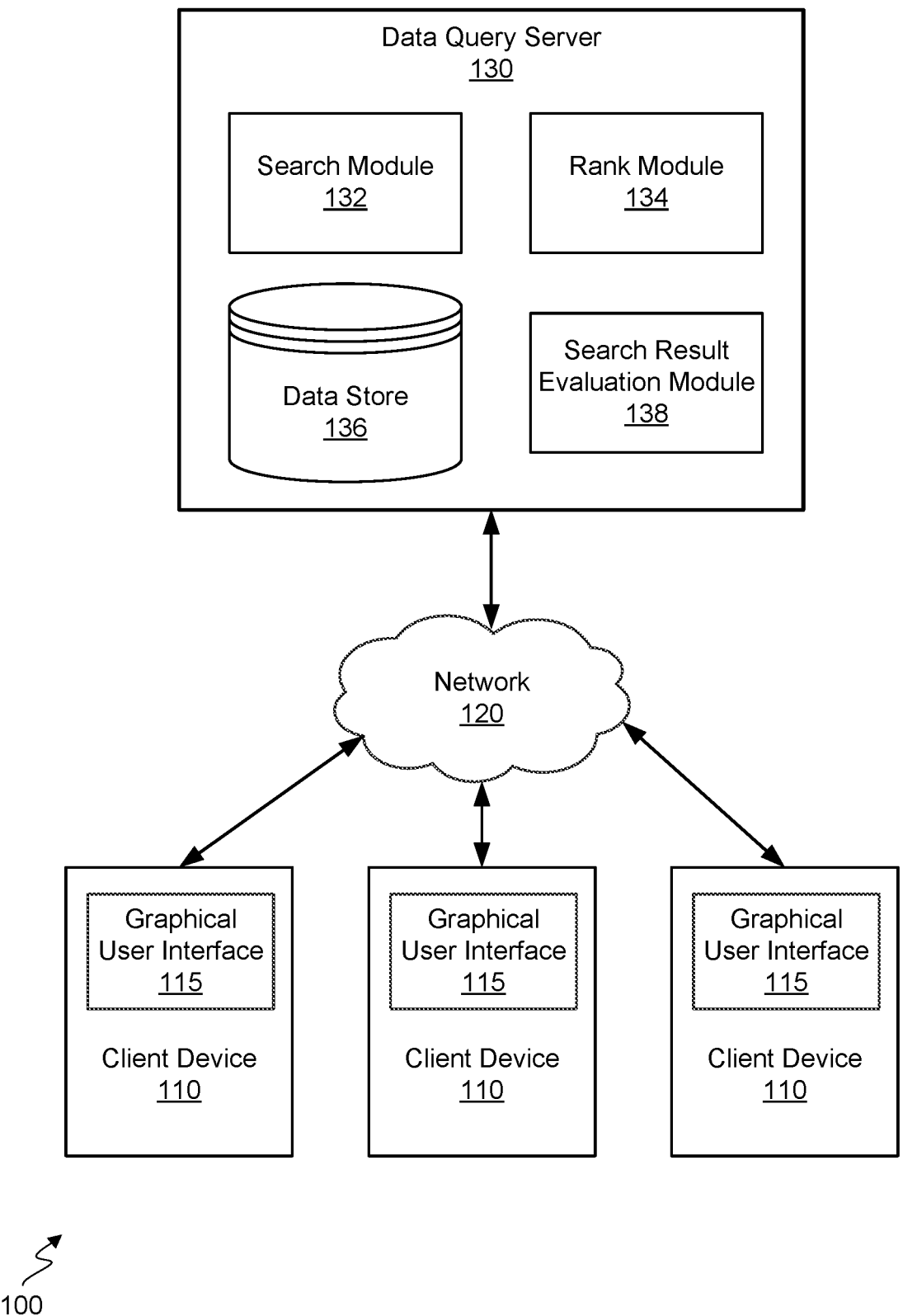
FIG. 1 is a block diagram of a system environment for a data query system, in accordance with an embodiment.

FIG. 1 is a block diagram of a system environment 100 for a data query system. In one embodiment, the system environment 100 is related to a genealogical data query system. In other embodiments, the system environment 100 is related to other data search and analysis systems. One or more client devices 110, a network 120, and a data query server 130 are presented in the system environment 100. The data query server 130 may be a genealogical data query server or other suitable data query servers.

The client devices 110 are one or more computing devices capable of receiving user input and transmitting and/or receiving data via the network 120. The client devices 110 may be conventional computers, such as desktop or laptop computers, personal digital assistants (PDAs), mobile phones, smartphones, tablets, smart wearable electronic devices, such as smart watches, other suitable electronic devices, or any combinations thereof. The client devices 110 may each execute an application to present a graphical user interface 115 to allow a user to interact with the data query server 130. The graphical user interface 115 may at least partially be operated by the data query server 130. For example, the graphical user interface 115 may be a software application designed and published by a company that operates the data query server 130. In another case, the graphical user interface 115 may be a website of the company. In yet another case, the client devices 110 may also interact with the data query server 130 through an application programming interface (API).

The network 120 may take the form of the Internet or any intranets. The network 120 may use any combination of cellular networks, wide area networks, and/or local area networks with wired and/or wireless communication systems. For example, the network 120 includes communication links using technologies such as Ethernet, 802.11, worldwide interoperability for microwave access (WiMAX), 3G, 4G, 5G, code division multiple access (CDMA), digital subscriber line (DSL), etc.

The data query server 130 shown in FIG. 1 includes a search module 132, a rank module 134, a data store 136 and a search result evaluation module 138. In other embodiments, the data query server 130 may include additional, fewer, or different components for various applications. Conventional components such as network interfaces, security functions, data management modules, and the like are not shown. The data query server 130 that can receive queries for data initiated from one or more users and can return data concerning the results of the queries to the client devices for presentations of the results. The data may be any data or information such as entries, images, strings, numbers, relationships, and etc. The data query server 130 may be a general search query server such as an Internet search engine that performs searches similar to well-known search engines such as Google, or may be a specialized search query server that focuses on a certain category of data and information such as scholar articles or genealogical data. In the case of a genealogical data query server, genealogical data may include data and information relating to the study or tracing of lines of family descent, census records of citizens, past records of people's life events, other vital data, genetic records such as DNA and genome-related data, etc. As discussed in further detail below in associated with FIGS. 4-7, the information diversity of the search results may be evaluated before the search results are presented to the users.

After the data query server 130 receives a user query, the search module 132 accesses the data store 136 to locate and return records that match the input specified in the user query. In the case of genealogy, a user query may specify one or more genealogical characteristics, which may include descriptions and vitals of people. For example, genealogical characteristics may include name, gender, spouse's information, relatives' information, dates, places for life events (e.g., birth and death), other vital data, etc. In response to and based on the user query, the search module 132 searches through a data store that includes one or more databases. The search module 132 returns records that match the user query. In one embodiment, the number of records of a search result varies among different search results. In another embodiment, the search module 132 may include a predetermined ceiling of search results (e.g., 100) and may select the records based on those that best match the user query. The search module 132 may rely on the exact match or expanded match (e.g., within certain degrees of fizziness of a search term) to locate the matched records.

The rank module 134 ranks the records located by the search module 132 based on certain rules and/or algorithms. For example, the rank module 134 may rank the searched records based on relevancy. Relevancy may be based on the search strings and criteria specified in a search query. In some cases, the relevancy of a record may depend on how the record is closely related to the search strings and criteria. Alternatively or additionally, the relevancy of a record may also depend on a likelihood of interaction (e.g., click, print, save, favorite, etc.) between a user and the record based on historical user interactions of the records. For more details on how the search module 132 and the rank module 134 may locate and rank searched records, PCT Application No. PCT/US2018/036058 entitled "Customized Coordinate Ascent for Ranking Records" filed on Jun. 5, 2018, is incorporated by reference in its entirety for all purposes.

The data store 136 comprises databases that store different records which contain information related to the subject matters of the databases. A record may be a file, a document, a data value, or a collection of data values that are grouped together. For example, if the data query server 130 is operated for searching financial data, the data store 136 may include stock information, prices, and other related financial data. A record in such case may include a company name, profile, the company's financial metrics, etc. collected as a unit. In the case of the data query server 130 being a genealogical data query server, the data store 136 may also be referred to as a genealogical index. A genealogical index may include different categories of records including names, relations, birth records, death records, marriage records, adoption records, census records, obituary records, etc. Genealogical data may include records that are obtained by digitalizing more formal records such as census records. Another source of data may come from users' manual input of family history and data. The data may be stored in any suitable data formats including SQL and NoSQL data formats.

The search result evaluation module 138 evaluates the quality of the search (ranked or not ranked) result and may approve or reject a given search ranked result. A search result may refer to a collection of records that match a query. When the search result evaluation module 138 rejects a search result, the search module 132 may conduct an additional search (e.g., by relaxing the search criteria) and/or the rank module 134 may re-rank the records in the search result. When the search result evaluation module 138 approves the search result, the data query server 130 may transmit data corresponding to the approved search result to the graphical user interface 115 of a client device and cause the graphical user interface 115 to display the search result in a rank order.

One example criterion of the quality of the search result is a degree of diversity of the search result. The degree of diversity of a search result may depend on one or more different factors. One factor is how distributed different classifications of the records are included in a search result. A search result may correspond to a higher degree of diversity when the search result includes more different types of records and a more uniformly distributed types when compared to another search result. Records may be classified based on one or more attributes of the records. An attribute may refer to a feature or a characteristic of a record. Different records have different attributes. For example, a search result of a generic Internet search may include different records that take the forms of web pages, news articles, images, videos, advertisements, etc. Those forms (a type of records) is an example attribute of the searched records. Another attribute of the same records could be the topics or sub-topics of the records (e.g., sport, video games, fine arts, politics, etc.). In another example, a search result may include a collection of scientific journals. Attributes of each record of the search result may be the sources (e.g., universities, industries, etc.) of the journals, the period of publication, subject matters (physics, chemistry, engineering, etc.) of the journals. Also, in some cases, records of the same search result may be classified in different ways based on different attributes. For example, the same scientific journals in the same search result may be classified in a first way based on the sources and in a second different way based on the subject matters. The degree of diversity may depend on the attributes used in classifying the search result.

In the case of genealogical data, one example attribute is the record categories, which can include birth, marriage, death, residence, immigration, military, court, directory records, etc. Another example attribute is the data sources (e.g., Census records, user-input data, etc.). Data value ranges of the records may also be examples of attributes of data. For example, age group may be an attribute of a record. Based on one or more attributes, the genealogical records in a search result can be classified into different record types. For instance, the eight record categories of birth, marriage, death, residence, immigration, military, court, directory records can be used to classify the records in a search result into eight different record types.

While classifying records into one of a plurality of record types is an example way to determine a degree of diversity of a search result, the degree of diversity of a search result may also depend on other factors. In some embodiments, the determination of the degree of diversity of a search result takes such classification into account, but also considers other factors in the search result.

Still referring to the search result evaluation module 138, another example criterion of the quality of the search result is the quality of the rank order of the search result. The quality of the rank order of the search result may correspond to the relevancy of individual records. Preferably, a more relevant record should be ranked higher than a less relevant record. As it will be discussed in further details below in FIGS. 4-7, the search result evaluation module 138 may determine an information entropy-based metric that can take both diversity of the rank order and diversity of the set of records into consideration in determining the quality of a search result.

FIG. 2 is an exemplary graphical user interface 115, in accordance with an embodiment. The graphical user interface 115 shown in FIG. 2 is related to a genealogical data query system. In such case, the graphical user interface 115 may be provided and operated by the genealogical data query server 130. The graphical user interface 115 is executable in the client device 110 and is configured to receive query input from a user via the client device 110. A user query for a genealogical index may specify one or more genealogical data values in different fields such as first name, last name, middle name, maiden name, location, date of birth, year of birth, database, etc. In a specific case shown in FIG. 2, a user specifies "John" in the first-name field and "Smith" in the last-name field in the query.

Figure 3:
FIG. 3 is a diagram illustrating a search result that shows a list of records searched and ranked, in accordance with an embodiment.

Based on the query received, the data query server 130 uses different modules 132, 134, and 138 to perform search, rank, and evaluation operations to return data of a search result to the client device 110. The data query server 130 also causes the graphical user interface 115 to present the search result in a rank order. FIG. 3 illustrates a search result 300 that is displayed in a graphical user interface 115 that shows a list of records searched and ranked. The list of records includes records 310, 320, 330, 340, etc. Each of the records 310, 320, 330, and 340 match the query that specifies "John Smith" (shown in FIG. 2) and is associated with a person. Each of the records 310, 320, 330, and 340 may have similar data values that are related to "John Smith," but include different attributes. For example, different records 310, 320, 330, and 340 can be associated with a different data category. The record 310 is associated with the data category of "birth," meaning the record may be obtained from a birth record. By the same token, the record 320 is associated with the data category "marriage" and the record 330 is associated with the data category "death." The records 310, 320, 330, and 340 may also include other different attributes. For example, whether the records include an exact value of the search string or a variation of the search string (e.g., "John" in 310 vs. "Johnny" in 330) may also be an example attribute that is different among the records.

Search, Rank, and Diversity Evaluation Process Overview

Figure 4:
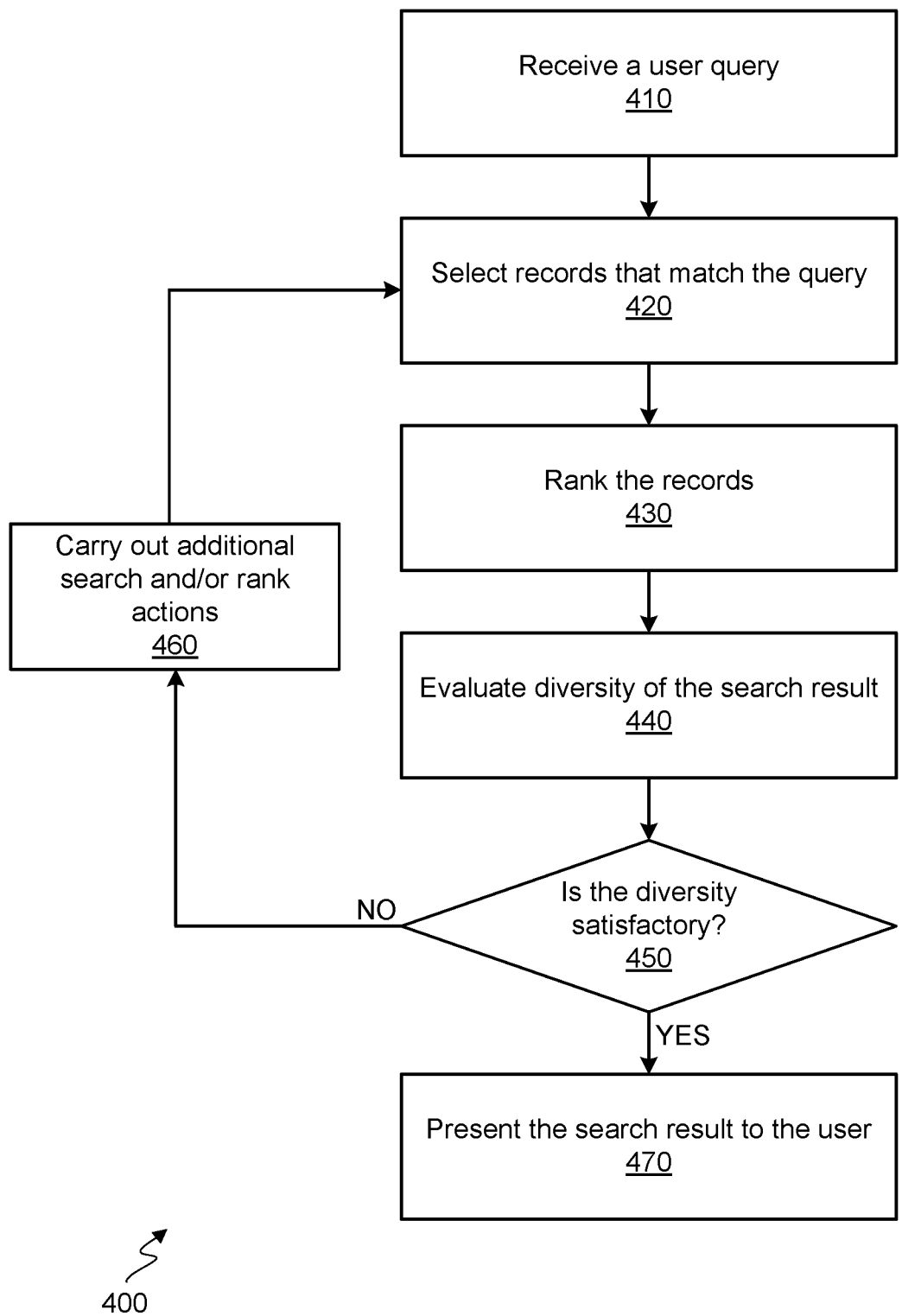
FIG. 4 is a flowchart depicting a search and rank process performed by a data query server, in accordance with an embodiment.

FIG. 4 is a flowchart depicting a search and rank process 400 performed by a data query server, such as the data query server 130 shown in FIG. 1, in accordance with an embodiment. The process 400 may begin when a data query server receives 410 a user query that may specify one or more search strings, criteria, and/or data range. In response, the data query server selects 420 records that match the query. After records are located, the data query server ranks 430 the records based on the likely relevancy of each record. The ranking of the records may be based on how closely the data values in the record are related to or match the search strings or criteria of the query. The ranking of the records may also be based on a projected likelihood of user interaction with the record that is estimated based on historical user interactions with the record. The data query server then evaluates 440 a degree of diversity of the search result. The evaluation of the degree of diversity may include a determination of an entropy-based metric, which will be discussed in further detail in associated with FIGS. 5-7.

In a decision stage 450, the data query server determines whether the diversity of the search result is satisfactory. If the diversity is not satisfactory, the data query server carries out 460 additional search and/or rank actions. In one case, the data query server may relax the criteria of the search query or increase the fizziness of the search strings to generate additional records. The data query server may also re-rank the search result that includes the additional records. In some cases, the data query server does not conduct an additional search, but simply re-ranks the original set of records in the search result so that the re-ranked set of records has a higher degree of diversity (e.g., a high value of the entropy-based metric) than the original set. If the diversity is satisfactory, the data query server presents 470 the search result in a rank order to the user via a graphical user interface of a client device.

Evaluation of Diversity Based on an Entropy-Based Metric

Figure 5A:
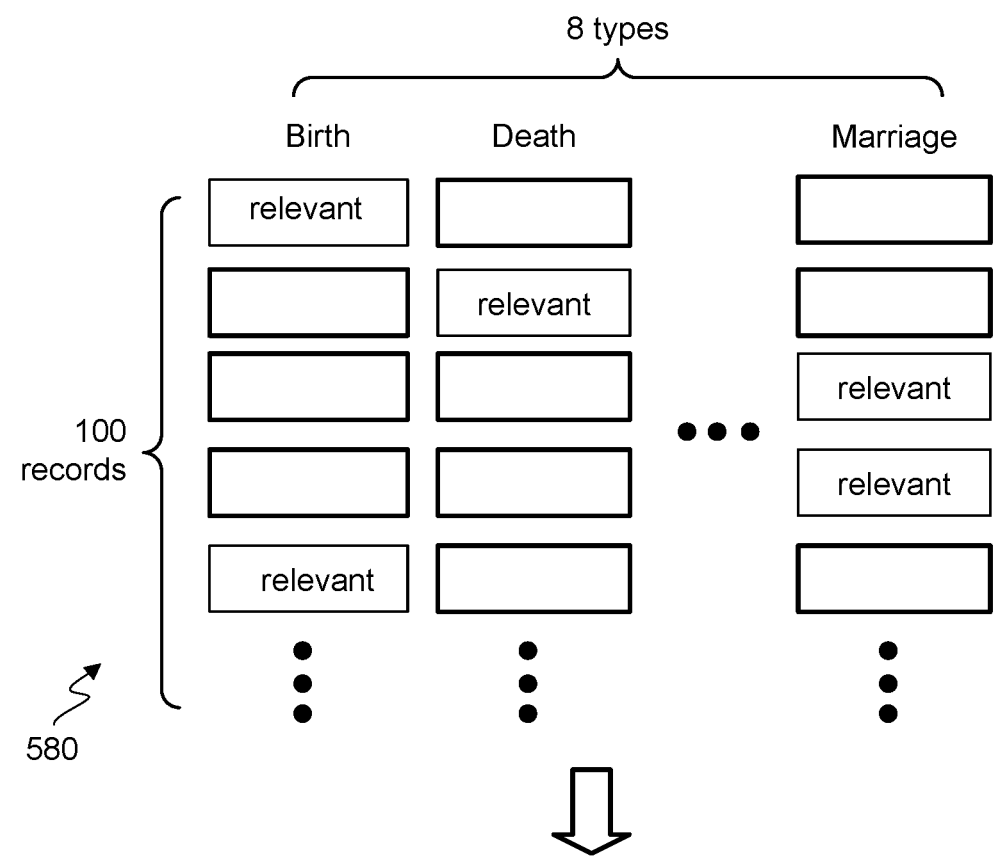
FIG. 5A is a flowchart depicting a process that evaluates the diversity of a search result, in accordance with an embodiment.
Figure 5B:
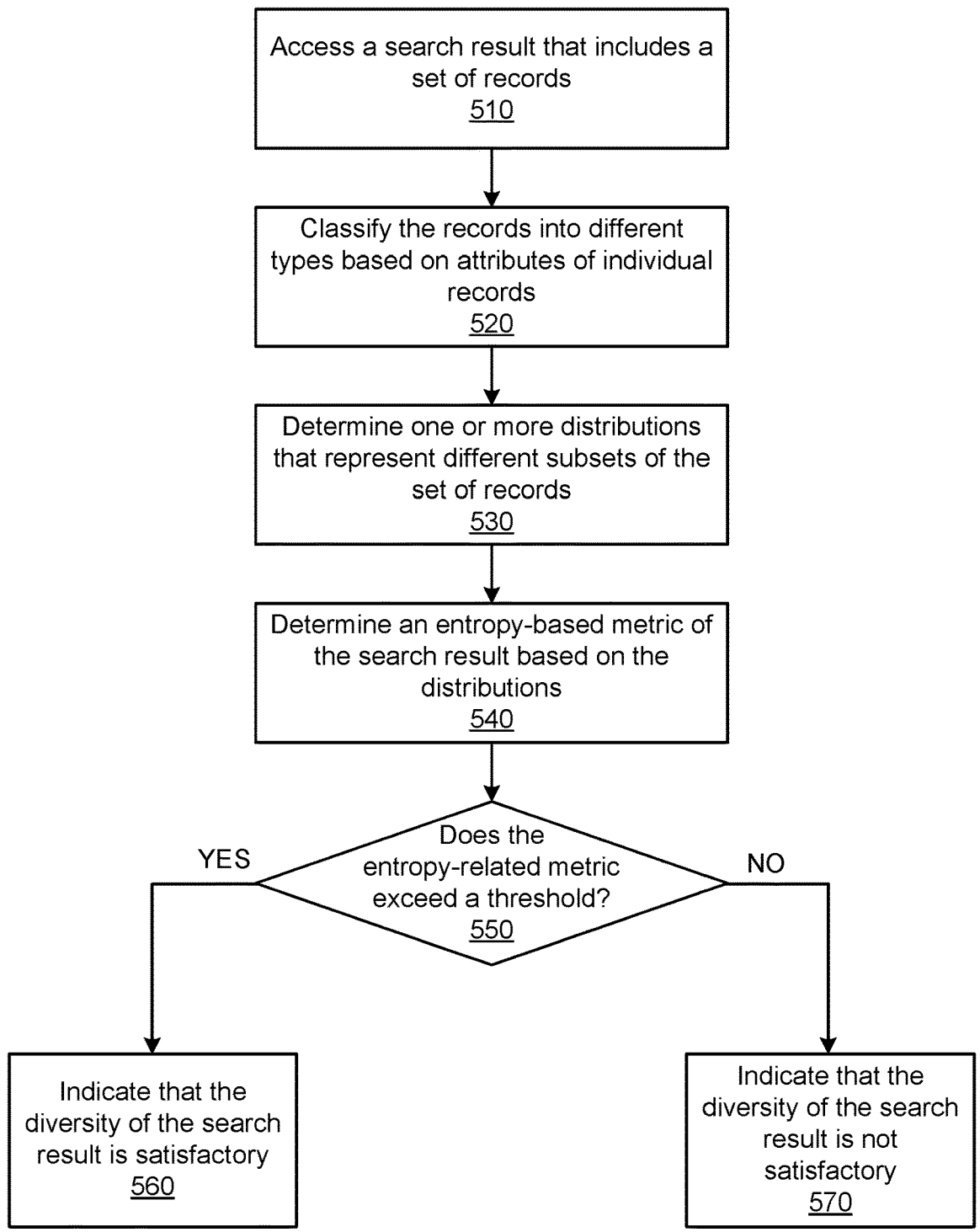
FIG. 5B is a block diagram illustrating how a subset of records in a search result is used to generate a distribution, in accordance with an embodiment.

Referring to FIGS. 5A and 5B, FIG. 5A is a block diagram illustrating how a set (or subset) of records in a search result is used to generate a distribution that is used to determine an entropy-based metric, in accordance to an embodiment. FIG. 5B is a flowchart depicting a process that evaluates a degree of diversity of a search result based on the entropy-based metric, in accordance with an embodiment. The process 500 described in FIG. 5B may correspond to element 440 in the process 400 shown in FIG. 4 regarding the evaluation of the diversity of a search result.

In general, information entropy, or sometimes referred to as Shannon entropy, corresponds to a degree of disorder or uncertainty of a system. Applying to the data query system 130, an entropy (or a metric calculated based on one or more entropy values of a search result) may represent a measure of the disorder of the search result. Given a set Q comprising n records $\{d_1, d_2, \ldots d_n\}$ and each record belongs to one of a plurality of record types $\in \{1, 2, \ldots, K\}$, the entropy for this set Q of records could be defined in the Equation (1) below as follows:

$$E(Q) = -\Sigma_{i=1}^{K} p_i \log p_i \qquad (1)$$

where E(Q) is the entropy of the set Q based on a distribution of the set of records that are classified into different record types, K is the number of record types, and $p_i$ is the proportion of records in the set that belong to record type i. The logarithm in calculating entropy values is usually to base 2 (i.e., binary logarithm) but other base logarithms can also be used and can be converted to base 2 using simple change-of-base operations.

FIG. 5A provides a graphical illustration of how the entropy of a set of records may be determined based on a classification approach. The upper portion 580 of FIG. 5A shows a set of 100 records that belong to a search result. Each record belongs to one of eight data categories: Birth, Marriage, Death, Residence, Immigration, Military, Court, and Directories. In other words, the data types of the records are classified based on the records' genealogical data categories. The use of a genealogical search result and data categories as the attribute to classify record types is for illustration purpose and should not be construed as the only possible way to classify records into different types. After each of the genealogical records is classified into one of the eight types, a distribution of numbers of genealogical records can be determined. The distribution may be graphically illustrated as a plot 590, although such a plot often is not needed to be visually constructed in actual processes to determine an entropy value. The plot 590 represents a distribution that comprises a set of 100 records. In the plot 590, each data type has a count of the number of genealogical records that are classified into the type. For example, the first type has a count of 10. As such, based on Equation (1), $p_1$ equals $10/100$ because the $p_i$ in Equation (1) is the proportion of records in the set of 100 records that belongs to record type i. Similar, $p_2$ equals $30/100$ and $p_8$ equals $13/100$. The underlying precise data values contained in each record may not affect the determination of the entropy value because the entropy value usually depends on the distribution of the records, not the actual values included in a record. After the count for each record type is determined, the entropy can be determined based on Equation (1).

While FIG. 5A illustrates the determination of the entropy of a search result based on an entire set of the records in a search result, the entropy of the search result may also be based on subsets of the records. Here, a set of records refers to a collection of a certain number of records. A subset refers to a collection that is equal to or smaller than the entire set. For example, a subset of five records can be selected from the set of 100 records and a subset can also have the entire set of 100 records. After a subset is selected, a distribution can be similarly determined based on the technique illustrated in FIG. 5A and the entropy value of such subset can be calculated based on Equation (1). The entropy value of an entire set of records or of any subset may serve as an entropy-based metric. Alternatively, as it will be discussed in further details below in associated with FIGS. 6A and 6B, the entropy-based metric may be a cumulative entropy that is a sum of the entropy values of different subsets of records of a search result.

An entropy may represent a degree of diversity of a set of records. Suppose there are two sets of records AAAB and AABB that are classified into either record type A and B. Then the entropy for two sets should respectively be:

$$E(AAAB) = -\tfrac{3}{4} \log \tfrac{3}{4} - \tfrac{1}{4} \log \tfrac{1}{4} = 0.8113 \qquad (2)$$

$$E(AABB) = -\tfrac{1}{2} \log \tfrac{1}{2} - \tfrac{1}{2} \log \tfrac{1}{2} = 1.0 \qquad (3)$$

For the same number of records in a set, the higher the entropy value, the more uniform is the distribution of the set. Hence, a set with a higher entropy-based metric may correspond to a more diversified set. In the above example, the entropy values show that AABB is more diversified than AAAB, as expected.

Referring to FIG. 5B, a process 500 to determine an entropy-based metric of a search result is illustrated. The process 500 may be executed by a module of a data query server. For example, the search result evaluation module 138 of the data query server 130 may execute the process 500. The process 500 may be initiated in response to a search query that is received from a user. The data query server accesses a set of records based on the search query. Each record includes one or more attributes. For example, the attribute may be data category, data source, or characteristics of data values. The data query server may also rank the set of records.

A search result evaluation module of the data query server then accesses 510 the search result that includes the set of records. The search result may be ranked or unranked. The search result evaluation module classifies 520 each of the records into different types based on attributes of individual records. The classification may be based on the attribute that is selected for the classification purpose. In other words, in some cases, the same set of records may be classified in different ways, depending on the attribute used. After the classification, the search result evaluation module selects one or more subset out of the set of records. The search result evaluation module then determines 530 one or more distributions of numbers of records that are classified into each record type. Each distribution corresponds to a subset of the records.

After one or more distributions are determined, the search result evaluation module determines 540 an entropy-based metric of the search result based on the distributions. In one embodiment, only a single distribution that corresponds to the entire set of records of the search result is determined and the entropy value of such distribution is used as the entropy-based metric. In another embodiment, one or more subsets are selected and one or more distributions that correspond to those subsets are determined. In such case, a cumulative entropy that corresponds to a sum of different entropy values of different distributions is used as the entropy-based metric. In yet another embodiment, the cumulative entropy is normalized to a predetermined range. Such normalized cumulative entropy is used as the entropy-based metric. The determination of cumulative entropy and normalized cumulative entropy will be discussed in further details below in associated with FIGS. 6A-7.

After the entropy-based metric is determined, the search result evaluation module compares 550 the metric to a threshold value. If the entropy-based metric exceeds the threshold, the search result evaluation module indicates 560 that the diversity of the search result is satisfactory. Otherwise, the search result evaluation module indicates 570 that the diversity of the search result is not satisfactory.

Cumulative Entropy and Rank Order

Although a simple entropy value of a set of records provides insight of the degree of diversity of the set, the entropy value normally does not provide sufficient indication to distinguish the degrees of diversity of different rank orders that have the same underlying distribution. For example, based on Equation (1), entropy for a ranked set AABB and that of another ranked set ABAB are the same. However, a data query server would provide a better performance if the ranked set ABAB is determined as having a more diversified ranking because the higher ranked records, which are usually more important to users, are more diversified in ABAB than in AABB.

In order to consider diversity based on rank orders, in one embodiment, an entropy-based metric, which is based on each ranked position and on summing of the entropy values of different subsets that correspond to different ranked positions, is used to represent the degree of diversity of a ranked search result. In this way, the entropy-based metric could represent ranking diversity and set diversity at the same time.

One example of cumulative entropy for a ranked set Q with n records $\{d_1, d_2, \ldots d_n\}$ is based on the following equation:

$$CE(Q)=\Sigma_{p=2}{}^{n}E(Q_p) \quad (4)$$

where CE(Q) is the cumulative entropy of the ranked set Q, $E(Q_p)$ is the entropy of the distribution corresponds to a subset $Q_p$ that includes records $\{d_1, d_2, \ldots d_p\}$ that are classified into different record types. For instance, the cumulative entropy for ranked set AABB and ABAB respectively may be:

$$CE(AABB)=E(AA)+E(AAB)+E(AABB) \quad (5)$$

$$CE(ABAB)=E(AB)+E(ABA)+E(ABAB) \quad (6)$$

In Equation (5), {AA}, {AAB}, and {AABB} are subsets of the set {AABB} that are selected with respect to different ranked positions of the set {AABB}. As shown by Equations (5) and (6), the cumulative entropy for ranked set ABAB is larger than AABB since the respective first subset's entropy value has a relationship E(AB)>E(AA). The entropy values for other subsets are the same. As illustrated by this example, a data query server could evaluate the diversity of ranking and set at the same time.

Figure 6A:
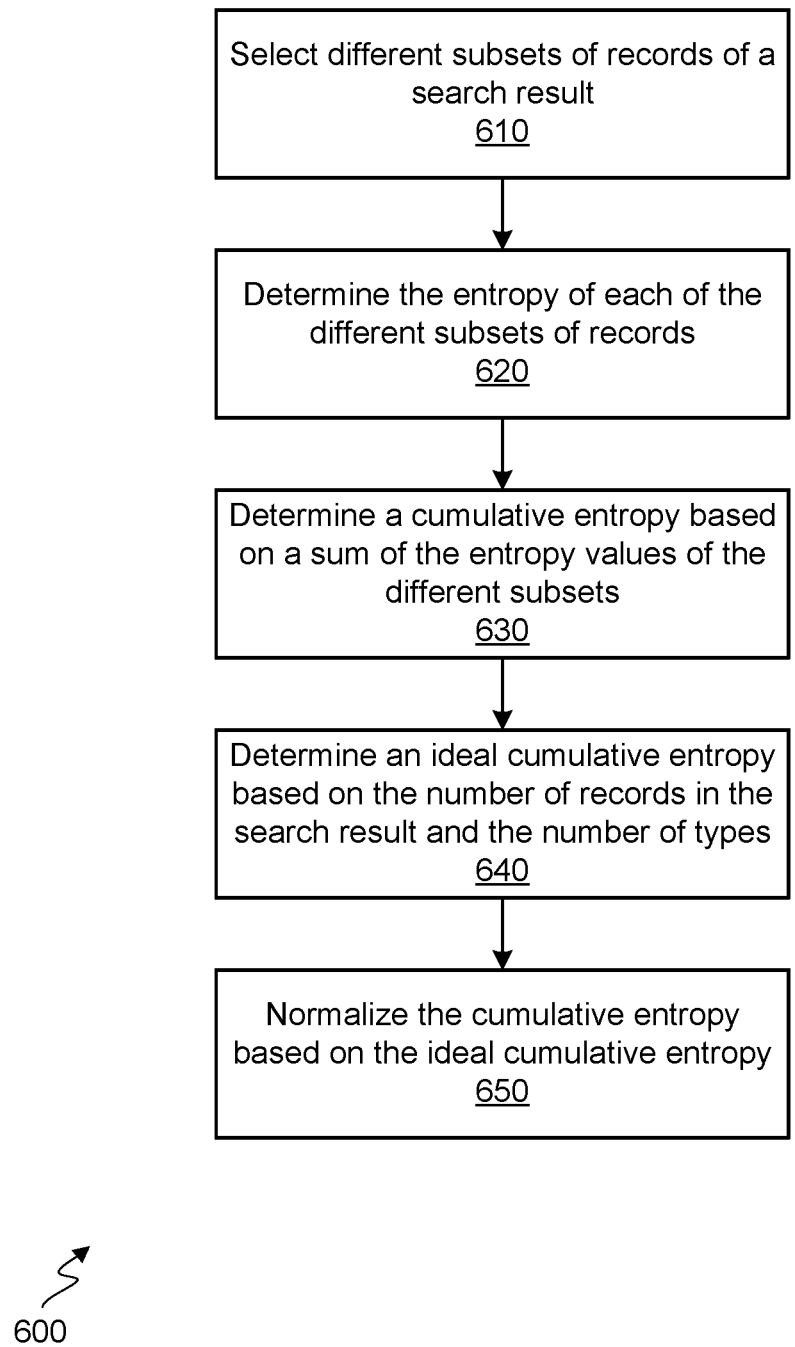
FIG. 6A is a flowchart depicting a process that determines an exemplary entropy-based metric of a search result, in accordance with an embodiment.

FIG. 6A illustrates a flowchart depicting a process 600 that determines a cumulative entropy-based metric of a search result, in accordance with an embodiment. The process 600 may be carried out when the diversity of a ranked search result is ready to be evaluated and may correspond to element 540 in the process 500 shown in FIG. 5B. When a ranked search result is present, a data query server selects 610 different subsets of records of the search result. The selection of different subsets may be carried out in different ways. One example way of a subset selection process will be illustrated in FIG. 6B. The subset selection process may include one or more criteria. For example, in one embodiment, a subset should have two or more records. Also, the two or more records should be within a threshold distance of each other by the rank order of the search result. Put differently, if the threshold distance is 20 and the entire set includes 100 records, the respective ranked positions of the farthest away records should not be larger than 20. However, different subsets may include repeated records. For example, a first subset can include the first five records while the second subset can include the first ten records.

After different subsets are selected, the data query server determines 620 the entropy value of each of the different subsets of records. The determination of the entropy value may be in accordance with Equation (1) and the process described in FIG. 5A. The data query server then determines 530 a cumulative entropy based on a sum of the entropy values of the different subsets. The Equation (4) is an example way to determine the cumulative entropy, but other ways to determine the cumulative entropy are also possible. For example, in an alternative embodiment, the cumulative entropy may be based on a weighted sum of the entropies values with subsets that are associated with higher ranks in the rank order having heavier weights. In yet another embodiment, the cumulative entropy may be a variation of the summation shown in Equation (4), such as an average of the summation. The determined cumulative entropy may be used as the entropy-based metric to represent the degree of diversity of a ranked search result.

To further improve the entropy-based metric, the data query server may determine 640 an ideal cumulative entropy based on the number of records in the search result and the number of record types. The data query server may then normalize 650 the cumulative entropy based on the ideal cumulative entropy to determine a normalized cumulative entropy that is set in a predetermined scale such as between 0 and 1. The determination of the ideal cumulative entropy will be discussed in further details in associated with FIG. 7. The normalized cumulative entropy may be used as the entropy-based metric to represent the degree of diversity of a ranked search result.

Referring specifically to element 610 of the process 600, in various embodiments, there can be different rules in selecting different subsets. In one embodiment, each of the subsets is smaller than the search result's entire set. Additionally or alternatively, each of the subsets may have different numbers of records. In other words, the size of each subset is different from another subset.

Figure 6B:
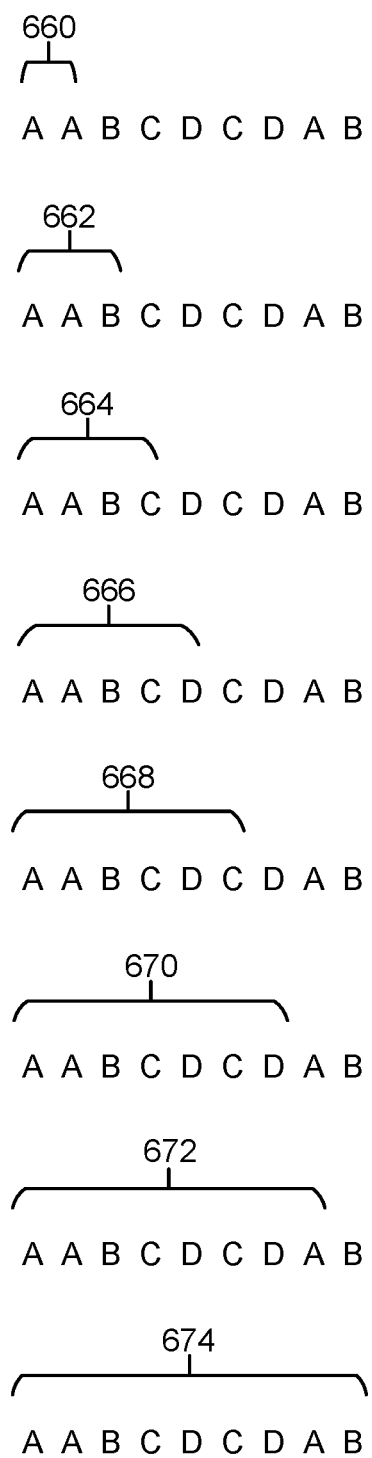
FIG. 6B is a diagram illustrating an exemplary process for selecting subsets in determining the exemplary entropy-based metric, in accordance with an embodiment.

FIG. 6B illustrates one example of selection rules in selecting subsets, in accordance with an embodiment. The subsets in FIG. 6B are selected consecutively based on a rank order of the search result. For the subsets in FIG. 6B, a latter subset includes one additional record than a previous subset. Also, the one additional record is the record that immediately succeeds the last record of the previous subset in the rank order. In other words, each of the next subsets includes an additional record ranked immediately after the entire previous subset. Since each subset includes the records before and right at the corresponding ranked position, the entropy of the subset may also be referred to as the entropy associated with that ranked position. To illustrate, a search result of 9 records are represented by their data types in FIG. 6B in a rank order (e.g., the first and second records are classified as data type A, the third record is classified as data type B, etc.). The first subset 660 selected includes the first two records. The second subset 662 selected includes the first subset 660 and the third record that is ranked immediately after the first subset 660. Likewise, the third subset 664 includes the first four records, etc. After the subsets 660, 662, 664, 666, 668, 670, 672, and 674 are selected, the distribution corresponds to each subset is determined and the entropy value of each distribution is determined based on Equation (1) and the process described in FIG. 5A. The cumulative entropy is then determined based on a sum of the entropy values of the subsets. In other words, the cumulative entropy is determined based on a sum of the entropy values associated with each ranked position. Because the higher ranked records are included in more subsets (e.g., the first two records are included in every subset in this example), the higher ranked records have more effect on the value of cumulative entropy. As such, the cumulative entropy may represent the diversity of ranking and set at the same time.

Although a specific example is illustrated in FIG. 6B, the selection process in accordance with different embodiments do not have to follow the exact rules described in FIG. 6B. For example, in one embodiment, the subset selection process may end before the last subset includes all records. In another embodiment, the difference between the sizes of two consecutive subsets may be larger than one record. In yet another embodiment, each subset may include unique records (i.e. records are not repeatedly selected) but the cumulative entropy may be weighted heavily towards subsets that include high ranked records. Other ways to select subsets are also possible.

Figure 6C:
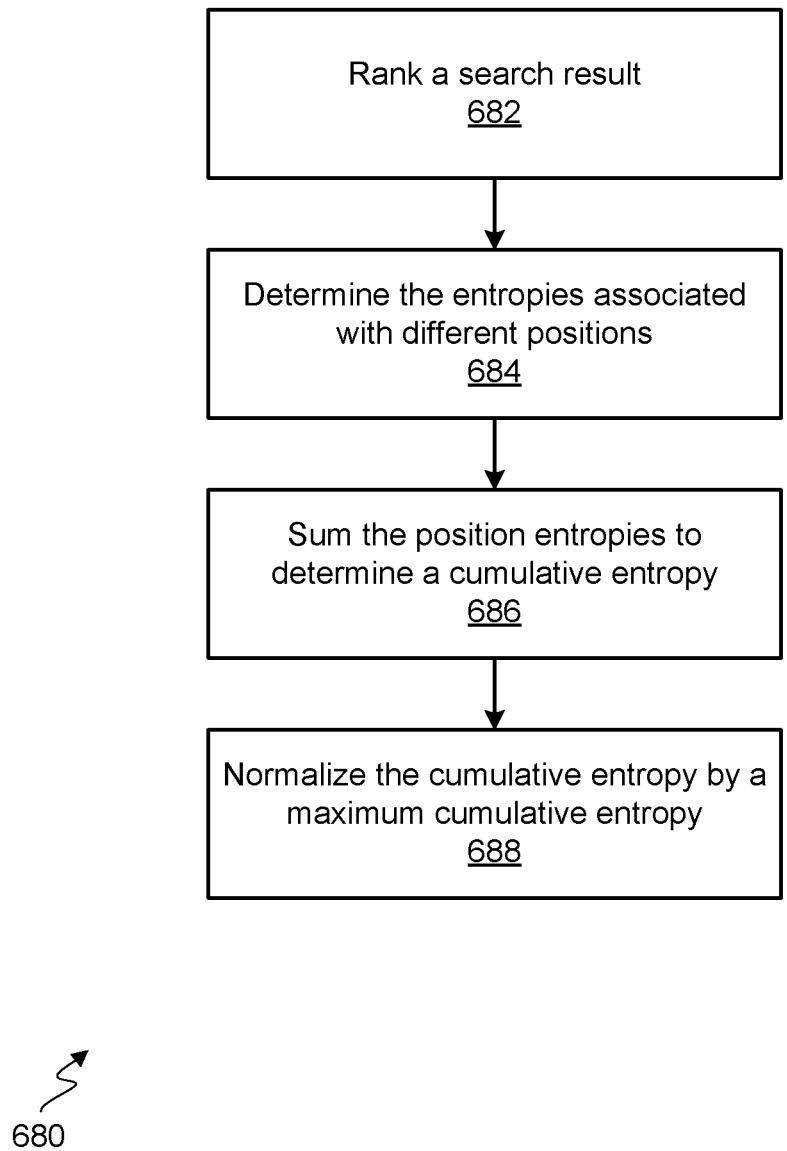
FIG. 6C is a flowchart depicting a process that determines a normalized cumulative entropy based on entropies with respect to different positions, in accordance with an embodiment.

FIG. 6C is a flowchart depicting a process 680 that determines a normalized cumulative entropy based on entropies with respect to different positions, in accordance with an embodiment. The process 680 in FIG. 6C may correspond to the graphical illustration shown in FIG. 6B. The process 680 may begin at a data query server ranking 682 a search result. The data query server then determines 684 the entropies associated with different ranked positions. The data query server then sums the position entropies to determine a cumulative entropy. The data query server then normalizes 688 the cumulative entropy by a maximum cumulative entropy. The maximum cumulative entropy may also be referred to as an ideal cumulative entropy.

Normalized Cumulative Entropy

The cumulative entropy calculated based on the Equation (4) or variations thereof may be influenced by the length of a search result or the number of subsets selected. Since search results are based on the corresponding search queries, the lengths of search results are often different for different queries. For example, in the case of a genealogical search, if a common name such as "John Smith" is input in the search query, the data query server will locate more results than other queries with a less common name specified. In such case, the cumulative entropy corresponds to the search result of the less common name could be consistently smaller than the search result of the more common name. It is not because the diversity of the search result of the less common name is often lower than the common name, but because, based on a subset selection process such as the process described in FIG. 6B, the search result of the less common name is often associated with fewer entropy values to add in Equation (4). In other words, the cumulative entropy could be dominated by the length of the search result.

In one embodiment, the cumulative entropy is normalized to balance the impact of the differences in the lengths in the search results. For example, the cumulative entropy is normalized by an ideal cumulative entropy (iCE), which may correspond to the summation of projected maximum entropy values of each subset in the search result. In one case, the Normalized Cumulative Entropy (NCE) for a ranked set Q of a search result with n records $\{d_1, d_2, \ldots d_n\}$ may correspond to $$NCE(Q) = \frac{CE(Q)}{iCE(Q)} \qquad (7)$$

By determining normalized cumulative entropies, the degrees of diversity of different search results can be compared based on the same scale across different queries. In one embodiment, the normalized cumulative entropy is normalized to a scale between 0 and 1. As such, the normalized cumulative entropy of any search result may be compared to a threshold that is pre-set to be between 0 and 1 (e.g., a threshold at 0.5). In response to the normalized cumulative entropy being lower than the threshold, the data query server may conduct additional search and/or re-rank the records in search result such that the re-ranked set of records has a value of normalized cumulative entropy that is higher than the original set. The re-ranking may include promoting the ranks of records that belong to rarer data types in the distribution of the set.

Determining Ideal Cumulative Entropy

In order to calculate ideal cumulative entropy (iCE), the first step is to determine a projected maximum entropy value for each position in search result. For example, each subset in FIG. 6B may correspond to a position in the search result. The ideal cumulative entropy may be determined by summing the projected maximum entropy values of the subsets. The entropy value of a subset is maximum when the subset has a uniform distribution (i.e., the number of records in each data type is the same). However, for a given subset that has n records, a perfectly uniform distribution may not be achievable because the number of records in the subset may not be divisible by the number of data types. In such case, some data types may have at least one record more than other data types.

For example, if the search results include 100 records and 8 record types, if the maximum entropy is projected based on a uniform probability distribution, the summation through all positions could be $$\Sigma_{p=2}^{8} \log i + \Sigma_{p=9}^{100} \log 8 \qquad (8)$$

By the same token, the projected maximum entropy for 9 records and 8 record types could be log 8=3. However, the exact maximum entropy should be 2.9477 if a constraint that each count should be an integer is in place. The difference could be significant for even one position. The more records are included in a search result, the larger difference it would be between an iCE that assumes a perfectly uniform distribution and an iCE that has the constraint of integers in place. If the value of maximum entropy using perfectly uniform distribution is used as the iCE, the normalized entropy-based metric would almost always be less than 1 because perfectly uniform distribution is often not achievable when the numbers of records in a record type take integer values. This could affect the performance of diversity evaluation. Mathematically, an iCE of n records and k record types with n≥k could be formulated as follows:

$$\max\left\{-\sum_{i=1}^{k} p_i \log p_i\right\}$$

$$\text{s.t.} \sum_{i=1}^{k} p_i = 1$$

$$p_i \in \left\{0, \frac{1}{n}, \frac{2}{n}, \ldots, \frac{n-1}{n}, 1\right\}$$

The constraint $$p_i \in \left\{0, \frac{1}{n}, \frac{2}{n}, \ldots, \frac{n-1}{n}, 1\right\}$$

indicates that the number of records in each record type is a non-negative integer. This could be a strong constraint in an optimization process and could make the calculation of the maximum entropy challenging. A relaxation approach may be used to obtain the maximum entropy.

In one embodiment, a method to calculate maximum entropy for discrete variables with finite values (feasible region) that is based on a branch and bound algorithm is used. Two premises are associated with the method. First, for a probability density function p on a finite set $\{P_1, P_2, \ldots P_k\}$, the entropy has maximum value if and only if p is uniform, i.e.

$$P_1 = P_2 = \ldots = P_k = \frac{1}{k}.$$

Second, for n records and k record types, the entropy has a maximum value when there are (i) $n_{s1}$ record types that have $S_1$ records in each of the $n_{s1}$ record types and (ii) $n_{s2}$ record types that have $s_2$ records in each of the $n_{s2}$ record type, where $S_1$ equals $\lfloor n/k \rfloor$, $S_2$ equals $\lceil n/k \rceil$, $n_{s2}$ equals n mod k, and equals $k - n_{s2}$.

Relaxing the strict constraint on the probability to any number between 0 and 1, the following conditions are obtained.

$$\max\left\{-\sum_{i=1}^{k} p_i \log p_i\right\} \text{ s.t. } \sum_{i=1}^{k} p_i = 1$$

$$0 \leq p_i \leq 1$$

Figure 7:
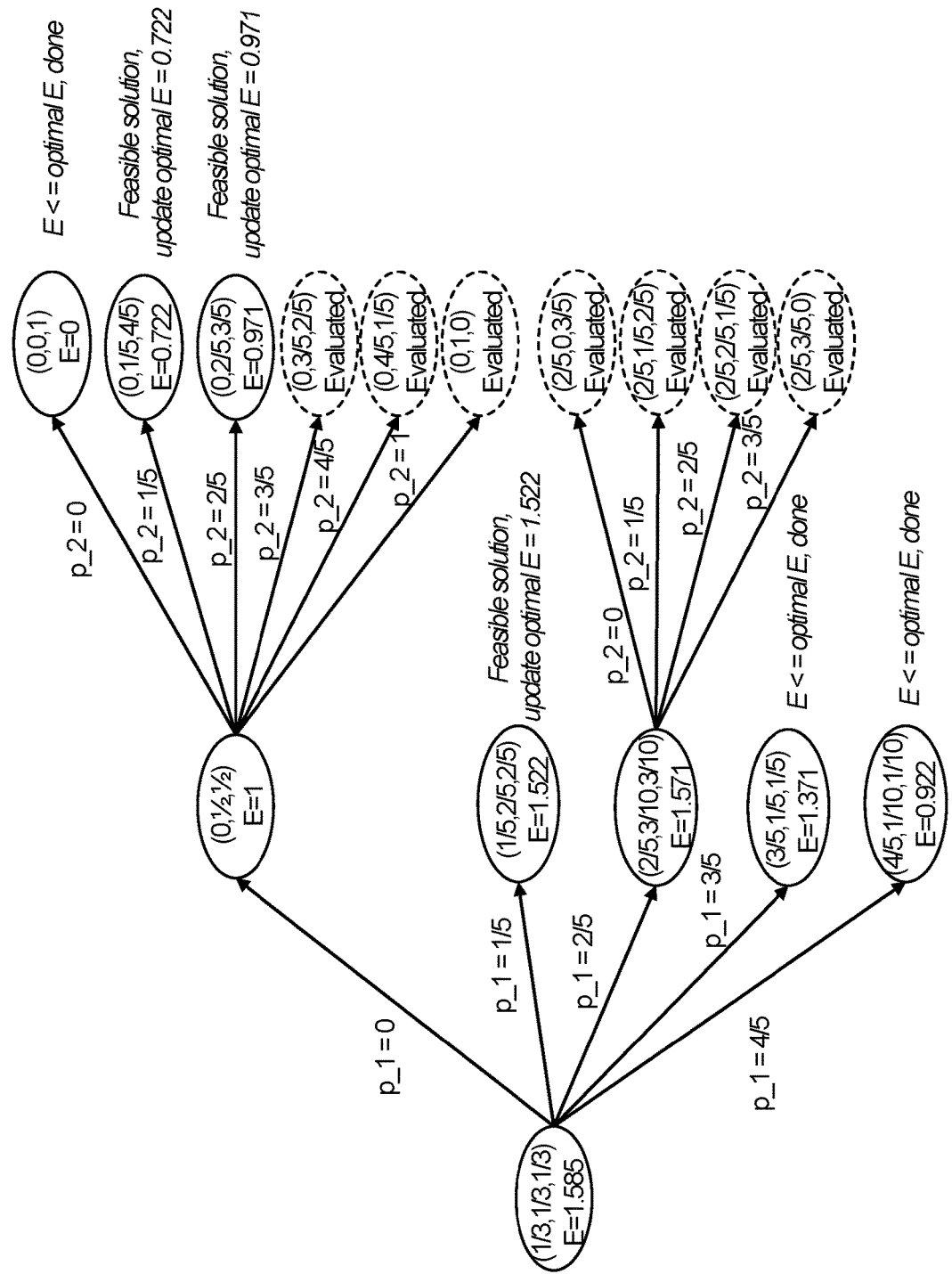
FIG. 7 is a tree diagram illustrating an exemplary algorithm to determine an ideal cumulative entropy, in accordance with an embodiment.

FIG. 7 is a tree diagram illustrating an exemplary algorithm to determine a projected maximum entropy based on a branch and bound algorithm, in accordance with an embodiment. The main steps of the algorithm are illustrated in the table below. The algorithm determines whether a potential solution of maximum entropy is evaluated before. This may be done by making use of the property that the order of the probability distribution does not affect entropy value to reduce the number of branches. The algorithm then determine whether a calculated value is feasible as a proposed maximum entropy in the relaxation problem by comparing the calculated value with the incumbent maximum value. If the calculated value is better than the incumbent value, it is used as a new proposed maximum entropy. Otherwise, the incumbent value remains.

| Algorithm 1 Maximum possible entropy calculation |
| --- |
| Input: n – number of records, k – number of record types |
| Output: The maximum possible entropy |
| 1     if n ≤ k then |
| 2        ⌊ return log n |
| 3     $s_1 \leftarrow \lfloor n/k \rfloor$ |
| 4     $s_2 \leftarrow \lceil n/k \rceil$ |
| 5     $n_{s2} =$ n mod k |

-continued

| Algorithm 1 Maximum possible entropy calculation |
| --- |
| 6     $n_{s1} = k - n_{s2}$ |
| 7     probs $= [s_1]*n_{s1} + [s_2]*n_{s2}$ |
| 8     return E(probs) |

FIG. 7 is illustrated with an example that has a ranked set of 5 records and 3 record types. The maximum entropy could be retrieved with a distribution of {2, 2, 1} records. For 5 records in 3 types, suppose there are $\{s_1, s_2, s_3\}$ records in each type with probability distribution $\{p_1, p_2, p_3\}$. The question could be formatted as a linear programming (LP) problem:

$$\max\{-[p_1 \log p_1 + p_2 \log p_2 + p_3 \log p_3]\}$$

$$s.t. \; p_1 + p_2 + p_3 = 1$$

$$p_i \in (0, 1/5, 2/5, 3/5, 4/5, 1)$$

For this example, the optimal solution of the LP relaxation is $$\max\{-[p_1 \log p_1 + p_2 \log p_2 + p_3 \log p_3]\}$$

$$s.t. \; p_1 + p_2 + p_3 = 1$$

$$p_i \geq 0$$

has an optimal solution at (⅓, ⅓, ⅓) with E=1.585.

Each branch in the algorithm can take an integer value for the count of the number of records in a first type. For example, there can be the following branches.

Branch 1: $p_1 = 0$. The problem becomes $$\max\{-p_2 \log p_2 - p_3 \log p_3\}$$

$$s.t. \; p_2 + p_3 = 1$$

$$p_i \in (0, 1/5, 2/5, 3/5, 4/5, 1)$$

For this example, the optimal solution of the LP relaxation is at (0, ½, ½) with E=1. Then sub-branches can be evaluated.
   1.1 $p_2 = 0$. The optimal solution is (0, 0, 1) with E=0 (not better than the current optimal entropy).
   1.2 $p_2 = ⅕$. The optimal solution is (0, ⅕, ⅘) with E=0.722 (feasible solution and becomes the current optimal solution).
   1.3 $p_2 = ⅖$. The optimal solution is (0, ⅖, ⅗) with E=0.971 (It's a feasible solution and becomes the current optimal solution).
   1.4 $p_2 = ⅗$. The solution (0, ⅗, ⅖) is evaluated previously.
   1.5 $p_2 = ⅘$. The solution (0, ⅘, ⅕) is evaluated previously.
   1.6 $p_2 = 1$. The solution (0, 1, 0) is evaluated previously.

Branch 2: $p_1 = ⅕$. For this example, the optimal solution of the LP relaxation $$\max\left\{-\left[\frac{1}{5} \log \frac{1}{5} + p_2 \log p_2 + p_3 \log p_3\right]\right\}$$

$$s.t \; \frac{1}{5} + p_2 + p_3 = 1$$

$$p_i \geq 0$$

is at (⅕, ⅖, ⅖) with E=1.522 (It's a feasible solution and becomes the current optimal solution.)

Branch 3: $p_1 = 2/5$. For this example, the optimal solution of the LP relaxation $$\max\left\{-\left[\frac{2}{5}\log\frac{2}{5} + p_2\log p_2 + p_3\log p_3\right]\right\}$$
$$\text{s.t } \frac{1}{5} + p_2 + p_3 = 1$$
$$p_i \geq 0$$

is at (2/5, 3/10, 3/10) with E=1.571
3.1 $p_2=0$. The solution (2/5, 0, 3/5) is evaluated previously.
3.2 $p_2=1/5$. The solution (2/5, 1/5, 2/5) is evaluated previously.
3.3 $p_2=2/5$. The solution (2/5, 2/5, 1/5) is evaluated previously.
3.4 $p_2=3/5$. The solution (2/5, 3/5, 0) is evaluated previously.
Branch 4: $p_1=3/5$. For this example, the solution of the LP relaxation $$\max\left\{-\left[\frac{3}{5}\log\frac{3}{5} + p_2\log p_2 + p_3\log p_3\right]\right\}$$
$$\text{s.t } \frac{3}{5} + p_2 + p_3 = 1$$
$$p_i \geq 0$$

is at (3/5, 1/5, 1/5) with E=1.371 (not better than the current optimal entropy).
Branch 5: $p_1=4/5$. For this example, the optimal solution of the LP relaxation $$\max\left\{-\left[\frac{4}{5}\log\frac{4}{5} + p_2\log p_2 + p_3\log p_3\right]\right\}$$
$$\text{s.t } \frac{4}{5} + p_2 + p_3 = 1$$
$$p_i \geq 0$$

is at (4/5, 1/10, 1/10 with E=0.922 (not better than the current optimal entropy).

Therefore, the current best solution (1/5, 2/5, 2/5) with E=1.522 is the optimal solution. This can be used as the projected maximum entropy of a set of 5 records and can be used to determine the ideal cumulative entropy. The ideal cumulative entropy is based on a total number of records in the set of the search result and a total number of record types. After the projected maximum entropies of one or more distributions corresponding to different subsets of the search result are determined, the projected maximum entropies can be summed to determine an ideal cumulative entropy.

EXAMPLE EXPERIMENTS

Experiments were conducted to evaluate the performance of an entropy-based metric such as the normalized cumulative entropy (NCE) and compared the performance to other existing metrics. In one embodiment, an assumption may be made that there is no substantial difference in terms of preference to a particular record type. In one case, when this assumption is the one of interests, the experiments show that an entropy-based metric out-performs other existing metrics, which could not measure properly such diversity under the assumption.

Figure 8:
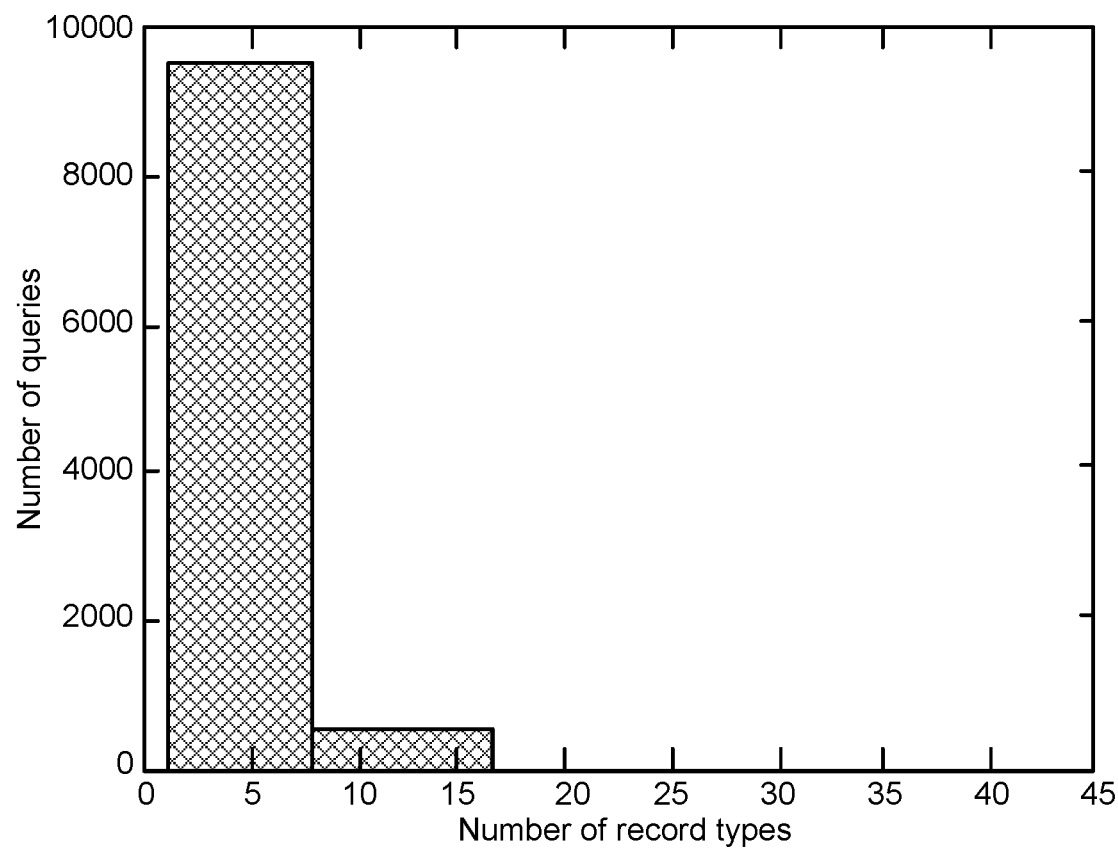
FIG. 8 is a plot illustrating a distribution in a dataset of the number of record types in search results based on different queries.

The data used in the experiments are search logs data from a genealogical index. There were 10,001 queries and 7,996,297 records in the dataset. For each query, about 800 records are located and each record belongs to one of eight record categories: Birth, Marriage, Death, Residence, Immigration, Military, Court, and Directories. As shown in FIG. 8 graph below, most queries have less than 8 relevant records across all record types.

Figure 9:
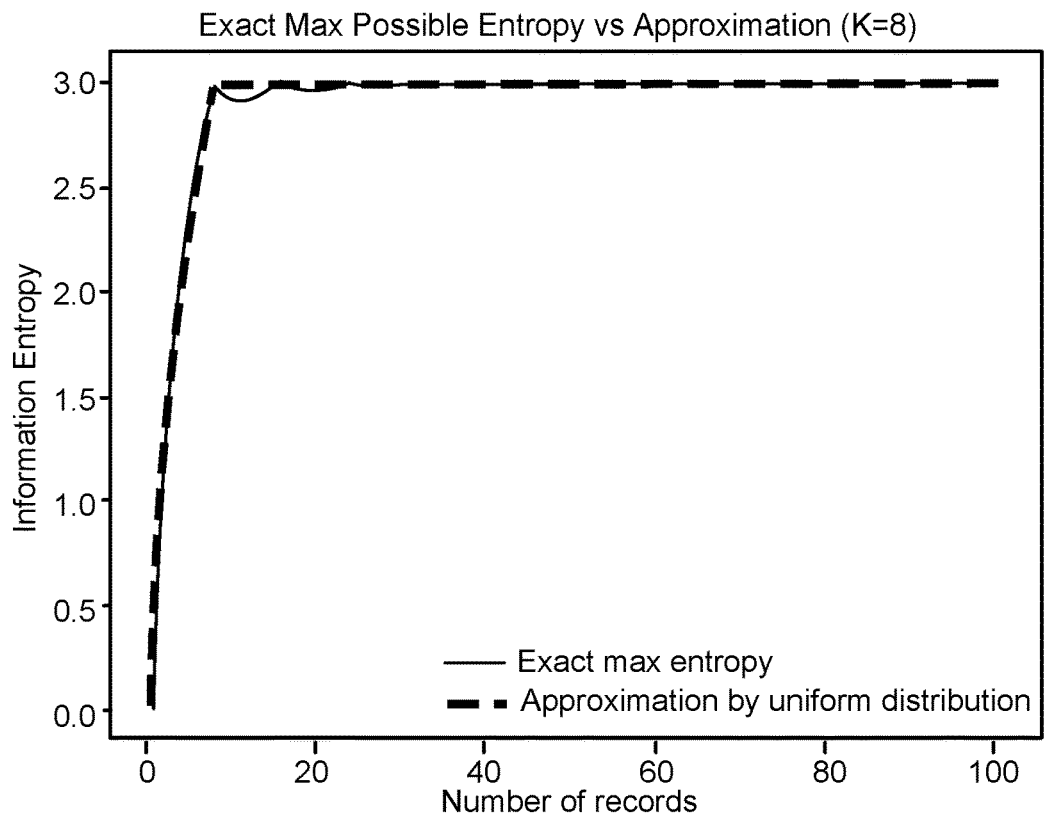
FIG. 9 is a plot illustrating an experimental result that shows the differences in approximating maximum entropy relative to the number of types of records in a search result, in accordance with an embodiment.

In the experiment, in order to optimize the diversity of the search result, the set of records in each search result is re-ranked for each query so that the re-ranked results could satisfy the following conditions:
1. Top 100 records in search results cover as many relevant records as possible;
2. Relevant records are ranked at the top of the returned list;
3. Top 100 records in search results include as many record types as possible;

As mentioned above regarding the determination of projected maximum entropy, the difference between the exact maximum entropy when the constraint of integers is in place and its approximation from a perfectly uniform distribution is significant. Therefore, an experiment is conducted to compare the difference between the two values. FIG. 9 compares the exact maximum possible entropy value and the approximated one from uniform distribution when there are 8 record types. As shown in FIG. 9, the difference could be fairly significant when there are comparable numbers of samples and record types.

Figure 10:
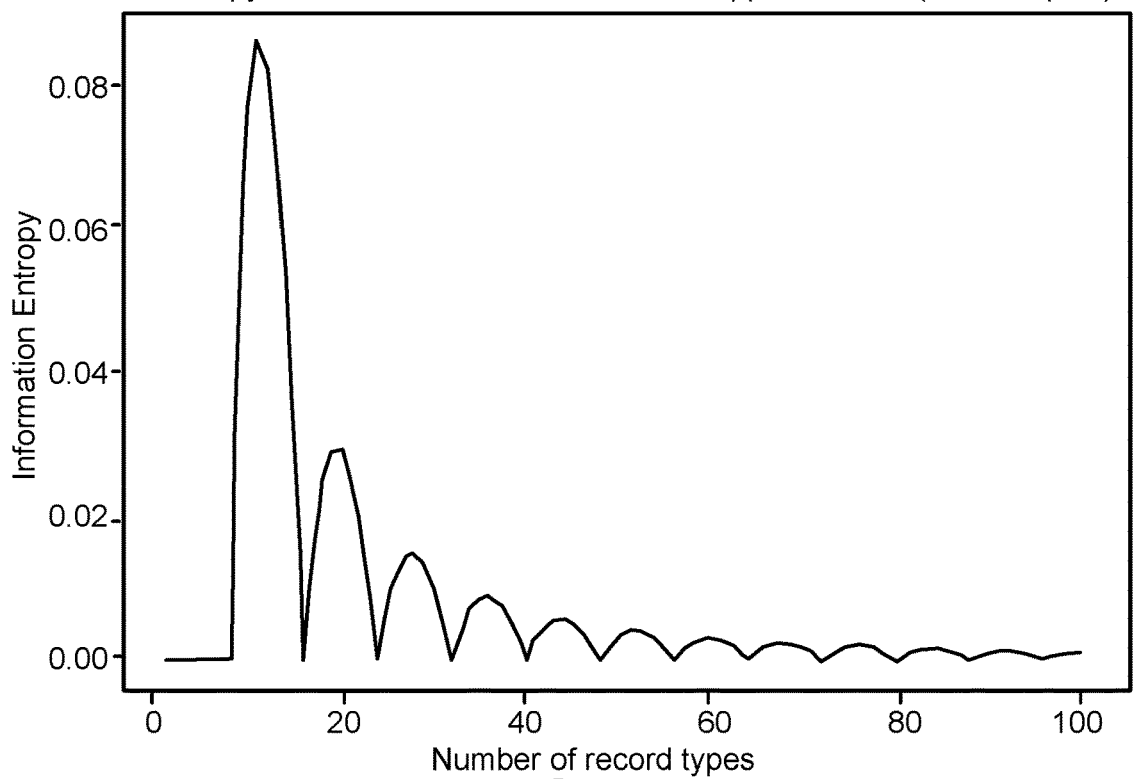
FIG. 10 is a plot illustrating an experimental result that shows the difference of the cumulative entropy between ideal cumulative entropy and approximated cumulative values, in accordance with an embodiment.

FIG. 10 compares the difference between exact maximum entropy when the constraint of integers is in place and an approximated one using uniform distribution regarding cases with different numbers of record types for 100 records. FIG. 10 illustrate a similar conclusion that the exact maximum entropy can be very different from the approximated value when a number of record types is comparable with sample size.

Figure 11:
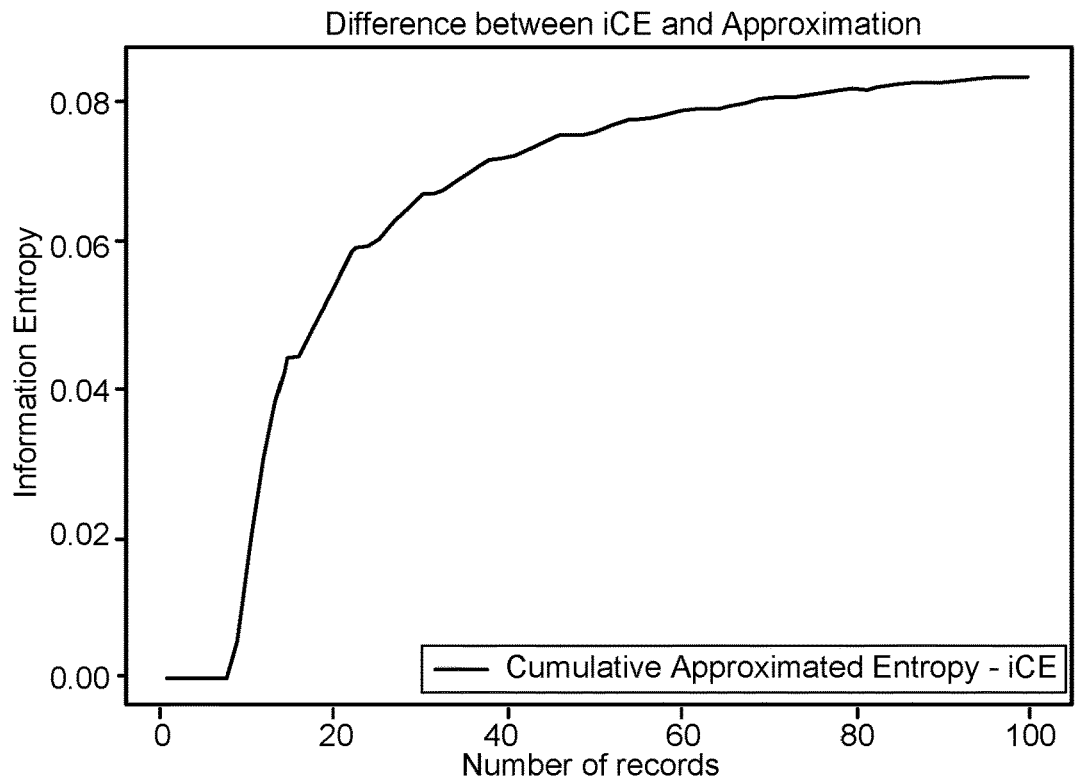
FIG. 11 is a plot illustrating an experimental result that shows the differences among the performance of different metrics that measure the diversity of a search result.

As mentioned, ideal cumulative entropy (iCE) is relevant to the number of records in a search result. FIG. 11 shows the difference between iCE and cumulative approximated values when there are eight record types. The difference becomes more and more significant with the number of records increasing.

In another experiment, the performance for normalized cumulative entropy against other non-entropy-based diversity metrics is compared using synthetic examples. Non-entropy-based diversity metrics include NDCG-IA proposed by Agrawal et al., 2009, in "Diversifying Search Results," Proceedings of the second ACM international conference on web search and data mining, ACM, 5-14, and S-recall proposed by Zhai et al., 2003, in "Beyond Independent Relevance: Methods and Evaluation Metrics for Subtopic Retrieval, in Proceedings of the 26th annual international ACM SIGIR conference (SIGIR '03), 10-17.

Referring to Table 1 below, the comparisons among normalized cumulative entropy (NCE) and other existing metrics are shown. Ranking list 1, ranking list 2, and ranking 3 are example search results. Different record types are represented by letters A, B, C, D, etc. The Table 1 also includes example data of relevance labels in the last column because some of the existing metrics need such data to be calculated. The ranking list 2 has the best diversity globally and locally because the ranking list 2 includes most numbers of different record types and also the diversity with respect to the rank positions are more uniform compared to the ranking list 3 (e.g., ABCD in the first four positions in ranking list 2 vs AABB in the first four positions in ranking list 3). Table 1 shows that a majority of existing metrics are unable to identify the ranking list 2 as the most diversified list and all of the existing metrics underperform compared to the NCE. In other words, none of the existing metrics could measure diversity properly under criteria of global and local diversity. Specifically, only S-recall and NCE correctly evaluate that the ranking list 2 has a better global diversity than the first one (4 record types in ranking list 2 vs 3 record types in ranking list 1). The other three metrics could not correctly measure the diversity as they are designed to measure diversity and relevance simultaneously. However, S-recall could not differentiate local diversity, as shown in the comparison between the ranking list 2 and the ranking list 3.

TABLE 1

Comparison of popular diversity metrics

| Position | Ranking list 1 | Ranking list 2 | Ranking list 3 | Relevant Label |
|---|---|---|---|---|
| 1 | A | A | A | 1 |
| 2 | A | B | A | 0 |
| 3 | B | C | B | 0 |
| 4 | B | D | B | 1 |
| 5 | B | A | C | 1 |
| 6 | C | B | C | 0 |
| 7 | C | C | D | 1 |
| 8 | C | D | D | 0 |
| NDCG-IA@8 | 0.775 | 0.658 | 0.908 | |
| MRR-IA | 0.667 | 0.625 | 0.875 | |
| MAP-IA | 0.694 | 0.625 | 0.875 | |
| S-recall@8 | 0.750 | 1.000 | 1.000 | |
| NCE@8 | 0.025 | 0.041 | 0.030 | |

In an experiment, a set of 100 records that are most relevant to a query are selected by a data query server. The experiment showed a simulated example with the 100 records from 8 record types and compared NDCG-IA, S-recall, and NCE for each position. The example is generated by random so the ranking should be fairly diversified.

Figure 12:
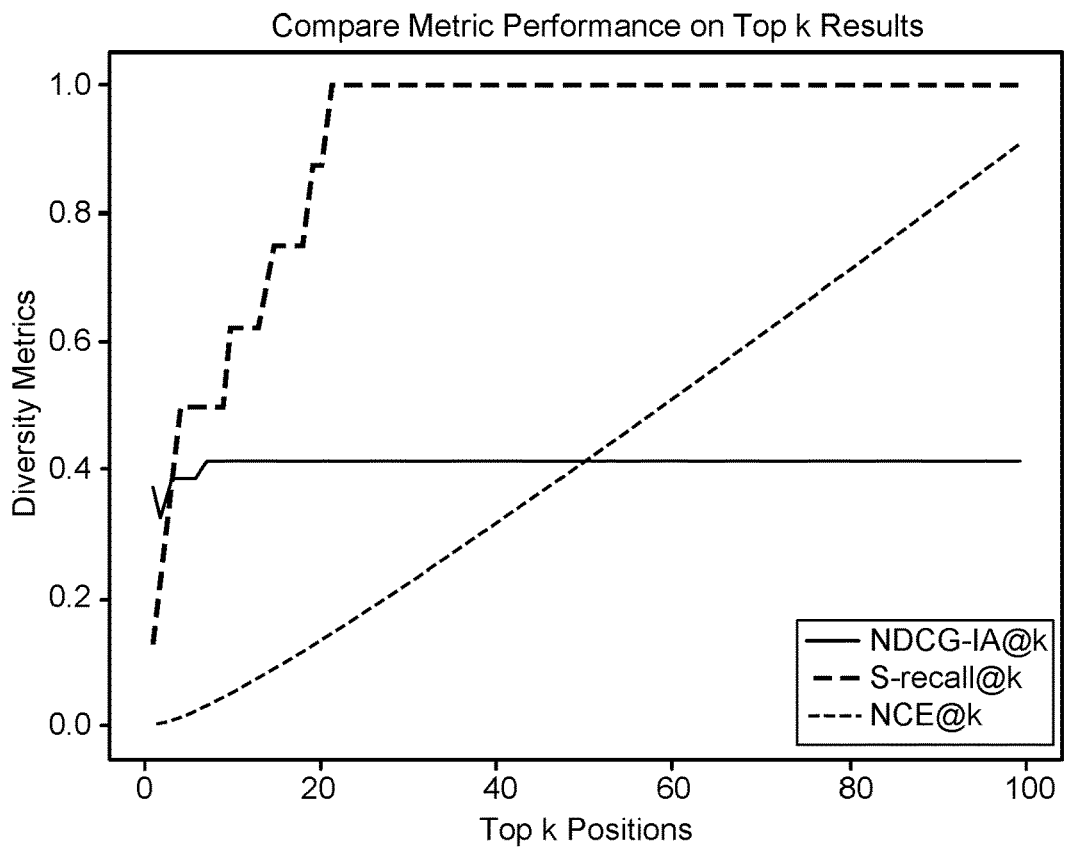

FIG. 12 shows the result of the experiment. As shown in FIG. 12, the NDCG-IA is highly impacted by the position of relevant records, which makes it sensitive at first 10 positions where the most relevant records located. Therefore, NDCG-IA could not catch ranking diversity in this case. As for S-recall, since the records only have 8 record types, the s-recall seems to have 8 levels and bounce once it covers a new record type. Therefore, it could not differentiate search results that have the same number of subtopics but in different orders. The figure shows that NCE changes in a smooth way, and take orders position into consideration.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

The invention claimed is:

1. A computer-implemented method, comprising:

accessing a set of genealogical records based on a search query, each genealogical record comprising one or more attributes;

ranking the set of genealogical records in a rank order;

classifying the genealogical records into a plurality of record types based on the one or more attributes of the genealogical records;

selecting, based on the rank order, a plurality of subsets from the set of genealogical records, each subset different from another subset, wherein the plurality of subsets comprise a first subset of genealogical records and a second subset that includes the first subset and at least an additional lower-ranked genealogical record that is ranked lower than any genealogical record in the first subset;

determining a plurality of distributions of numbers of genealogical records that are classified into each of the plurality of record types, each of the plurality of distributions corresponding to one of the plurality of subsets;

determining an entropy-based metric corresponding to the set of genealogical records, wherein the entropy-based metric represents a degree of diversity of the set of genealogical records in the rank order, wherein determining the entropy-based metric comprises:

determining a plurality of entropy values of the plurality of subsets, each subset having an entropy value that is determined based on the distribution corresponding to the subset, wherein at least a first distribution corresponds to the genealogical records in the first subset and a second distribution corresponds to the genealogical records in the second subset that includes the first subset and at least the additional lower-ranked genealogical record;

adding the plurality of entropy values together to determine a sum of the entropy values of the plurality of subsets;

determining a cumulative entropy that corresponds to the sum of the entropy values of the plurality of subsets, the cumulative entropy being the entropy-based metric, wherein, for the cumulative entropy, the genealogical records in the first subset are weighted heavier than the additional lower-ranked genealogical record; and generating an indication of the degree of diversity of the set of genealogical records.

2. The computer-implemented method of claim 1, wherein at least one of the entropy values of the plurality of subsets is determined based on:

$$E(Q) = -\sum_{i=1}^{K} p_i \log p_i$$

3. The computer-implemented method of claim 1, wherein determining the entropy-based metric further comprises:
determining an ideal cumulative entropy; and
determining a normalized cumulative entropy that is based on the cumulative entropy normalized by the ideal entropy, the normalized cumulative entropy being the entropy-based metric instead of the cumulative entropy.

4. The computer-implemented method of claim 3, wherein the normalized cumulative entropy is normalized to a scale between 0 and 1, and the computer-implemented method further comprises:
comparing the normalized cumulative entropy to a threshold that is pre-set to be between 0 and 1;
responsive to the normalized cumulative entropy being below the threshold, re-ranking the set of genealogical records.

5. The computer-implemented method of claim 3, wherein determining the ideal cumulative entropy comprises:
determining maximum entropies of each of the plurality of distributions, each distribution having a maximum entropy based on a number of genealogical records in the distribution and a number of record types in the distribution; and
summing the maximum entropies.

6. The computer-implemented method of claim 1, wherein the one or more attributes used to classify each of the genealogical records into one of the plurality of record types are data categories selected from one or more of: birth, marriage, death, residence, immigration, military, court, or directories.

7. The computer-implemented method of claim 1, further comprising:
comparing the entropy-based metric to a threshold; and
responsive to the entropy-based metric being below the threshold, re-ranking the set of genealogical records.

8. The computer-implemented method of claim 7, wherein a re-ranked set of genealogical records, which is re-ranked from an original set, has a value of entropy-based metric that is higher than the original set.

9. The computer-implement method of claim 1, wherein determining the plurality of distributions comprises:
selecting the subsets of genealogical records from the set of genealogical records based on a rank order of the set based on criteria of: (i) having two or more genealogical records in each subset, and (ii) the two or more genealogical records of the subset being within a threshold distance of each other by the rank order;
determining a distribution for each of subsets by counting a number of records that are classified into each record type.

10. The computer-implemented method of claim 9, wherein each of the subsets is smaller than the set.

11. The computer-implemented method of claim 10, wherein each of the subsets has a different number of genealogical records.

12. A computer-implemented method, comprising:
accessing a set of genealogical records that correspond to a rank order;
determining an entropy value associated with each ranked position in the set of genealogical records, the entropy value associated with each ranked position corresponding to a distribution of a subset of genealogical records that are selected based on the ranked position, wherein at least a first distribution that corresponds to a first ranked position includes a first subset of genealogical records and a second distribution that corresponds to a second ranked position includes the first subset and at least an additional lower-ranked genealogical record;
determining an entropy-based metric based on the entropy values of the ranked positions in the set of genealogical records, wherein determining the entropy-based metric comprises:
adding the entropy values of the ranked positions in the set of genealogical records to determine a sum of the entropy values associated with the ranked positions;
determining a cumulative entropy that corresponds to the sum of the entropy values associated with the ranked positions, the cumulative entropy being the entropy-based metric, wherein, for the cumulative entropy, the genealogical records in the first subset are weighted heavier than the additional lower-ranked genealogical record;
responsive to the entropy-based metric being lower than a threshold of a predetermined value of cumulative entropy, re-determining the rank order; and
responsive to the entropy-based metric being greater than the threshold of the predetermined value of cumulative entropy, generating an indication of a degree of diversity of the set of genealogical records.

13. The computer-implemented method of claim 12, wherein the subset of genealogical records associated with a ranked position comprises genealogical records that precede the ranked position.

14. The computer-implemented method of claim 12, wherein each of the subset associated with each ranked position has a different number of records.

15. The computer-implemented method of claim 12, wherein determining the entropy-based metric further comprises:
determining an ideal cumulative entropy; and
determining a normalized cumulative entropy that is based on the cumulative entropy normalized by the ideal entropy, the normalized cumulative entropy being the entropy-based metric instead of the cumulative entropy.

16. The computer-implemented method of claim 15, wherein determining the ideal cumulative entropy comprises:
determining maximum entropies of each of the plurality of distributions, each distribution having a maximum entropy based on a number of genealogical records in the distribution and a number of record types in the distribution; and
summing the maximum entropies.

17. A non-transitory computer readable storage medium configured to store program code, the program code comprising instructions that, when executed by a processor, cause the processor to:
access a set of genealogical records based on a, search query, each genealogical record comprising one or more attributes;

rank the set of genealogical records in a rank order;
classify the genealogical records into a plurality of record types based on the one or more attributes of the genealogical records;
select, based on the rank order, a plurality of subsets from the set of genealogical records, each subset different from another subset, wherein the plurality of subsets comprise a first subset of genealogical records and a second subset that includes the first subset and at least an additional lower-ranked genealogical record that is ranked lower than any genealogical record in the first subset;
determine a plurality of distributions of numbers of genealogical records that are classified into each of the plurality of record types, each of the plurality of distributions corresponding to one of the plurality of subsets;
determine an entropy-based metric corresponding to the set of genealogical records, wherein the entropy-based metric represents a degree of diversity of the set of genealogical records in the rank order, wherein determine the entropy-based metric comprises:
 determine a plurality of entropy values of the plurality of subsets, each subset having an entropy value that is determined based on the distribution corresponding to the subset, wherein at least a first distribution corresponds to the genealogical records in the first subset and a second distribution corresponds to the genealogical ords in the second subset that includes the first subset and at least the additional lower-ranked genealogical record:
 add the plurality of entropy values together to determines a sum of the entropy values of the plurality of subsets;
 determine a cumulative entropy that corresponds to the sum of the entropy values of the plurality of subsets, the cumulative entropy being the entropy-based metric, wherein, for the cumulative entropy, the genealogical records in the first subset are weighted heavier than the additional lower-ranked genealogical record; and
generate an indication of the degree of diversity of the set of genealogical records.

18. The non-transitory computer readable storage medium of claim 17, wherein determine the entropy-based metric further comprises:
 determine an ideal cumulative entropy; and
 determine a norma,li.zed cumulative entropy that is based on the cumulative entropy normalized by the ideal entropy, the normalized cumulative entropy being the entropy-based metric instead of the cumulative entropy.

19. The non-transitory computer readable storage medium of claim 18, wherein determine the ideal cumulative entropy comprises:
 determine maximum entropies of each of the plurality of distributions, each distribution having a maximum entropy based on a number of genealogical records in the distribution and a number of record types in the distribution; and
 sum the maximum entropies.

20. The non-transitory computer readable storage medium of claim 17, wherein determine the plurality of distributions comprises:
 select the subsets of genealogical records from the set of genealogical records based on a rank order of the set based on criteria of: (i) having two or more genealogical records in each subset, and (ii) the two or more genealogical records of the subset being within a threshold distance of each other by the rank order;
 determine a distribution for each of subsets by counting a number of records that are classified into each record type.

* * * * *

UNITED STATES PATENT AND TRADEMARK OFFICE
CERTIFICATE OF CORRECTION

PATENT NO. : 10,896,189 B2  
APPLICATION NO. : 16/481030  
DATED : January 19, 2021  
INVENTOR(S) : Jiang et al.

Page 1 of 1

It is certified that error appears in the above-identified patent and that said Letters Patent is hereby corrected as shown below:

In the Claims

In Column 23, in Claim 9, Line 52, delete "computer-implement" and insert -- computer-implemented --, therefor.

In Column 24, in Claim 17, Line 65, delete "on a," and insert -- on a --, therefor.

In Column 25, in Claim 17, Line 29, delete "ords" and insert -- records --, therefor.

In Column 25, in Claim 17, Line 31, delete "record:" and insert -- record; --, therefor.

In Column 25, in Claim 17, Lines 32-33, delete "determines" and insert -- determine --, therefor.

In Column 26, in Claim 18, Line 12, delete "norma,li.zed" and insert -- normalized --, therefor.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*